(12) United States Patent
Ishikawa et al.

(10) Patent No.: US 9,653,723 B2
(45) Date of Patent: *May 16, 2017

(54) BATTERY TERMINAL, FUSE UNIT, AND METHOD FOR MANUFACTURING FUSE UNIT

(71) Applicant: Yazaki Corporation, Tokyo (JP)

(72) Inventors: Yoshinori Ishikawa, Makinohara (JP); Takahiro Shiohama, Susono (JP); Tatsumasa Itagaki, Susono (JP); Shinya Onoda, Makinohara (JP)

(73) Assignee: Yazaki Corporation, Tokyo (JP)

( * ) Notice: Subject to any disclaimer, the term of this patent is extended or adjusted under 35 U.S.C. 154(b) by 35 days.

This patent is subject to a terminal disclaimer.

(21) Appl. No.: 14/863,622

(22) Filed: Sep. 24, 2015

(65) Prior Publication Data

US 2016/0093869 A1    Mar. 31, 2016

(30) Foreign Application Priority Data

Sep. 26, 2014 (JP) ................. 2014-196600
Sep. 26, 2014 (JP) ................. 2014-196601

(51) Int. Cl.
*H01M 2/34* (2006.01)
*H01M 2/30* (2006.01)

(52) U.S. Cl.
CPC ............. *H01M 2/34* (2013.01); *H01M 2/305* (2013.01); *H01M 2200/103* (2013.01)

(58) Field of Classification Search
CPC ........ H01M 2/34; H01M 2/305; H01M 10/48; H01M 2220/20; H01M 2200/103
See application file for complete search history.

(56) References Cited

U.S. PATENT DOCUMENTS

| 5,302,143 A | 4/1994 | Inoue et al. |
| 2013/0011703 A1* | 1/2013 | Kim ........................ H01M 2/30 429/61 |

(Continued)

FOREIGN PATENT DOCUMENTS

| JP | 05-097056 U | 12/1993 |
| JP | 2009-170423 A | 7/2009 |

(Continued)

OTHER PUBLICATIONS

Office Action drafted Sep. 28, 2016, issued for the Japanese patent application No. 2014-196600 and English translation thereof.

(Continued)

*Primary Examiner* — Stewart Fraser
(74) *Attorney, Agent, or Firm* — Locke Lord LLP

(57) ABSTRACT

A battery terminal includes a terminal main body provided in opposed plates thereof as a pair, formed by folding approximately in a U shape a strip plate made of a conductive metal, respectively with electrode insertion holes in which a rod-like electrode projecting from a terminal attaching surface in a battery is sequentially inserted, and formed to extend toward an outer edge of the terminal attaching surface at time of being connected to the rod-like electrode, and a joint joining the pair of the opposed plates in a state in which the opposed plates surface-contact and overlap each other on an opposite side of a folded part as seen from the electrode insertion hole.

19 Claims, 14 Drawing Sheets

(56) References Cited

U.S. PATENT DOCUMENTS

| | | | | |
|---|---|---|---|---|
| 2013/0102205 A1* | 4/2013 | Onoda | ................... | H01H 69/02 |
| | | | | 439/874 |
| 2015/0357623 A1* | 12/2015 | Onoda | ..................... | H01M 2/34 |
| | | | | 429/61 |
| 2016/0093868 A1* | 3/2016 | Ishikawa | ............... | H01M 2/305 |
| | | | | 429/61 |

FOREIGN PATENT DOCUMENTS

| | | |
|---|---|---|
| JP | 2011-070900 A | 4/2011 |
| JP | 2011-187301 A | 9/2011 |
| JP | 2011-187301 A | 9/2011 |
| JP | 2013-037770 A | 2/2013 |

OTHER PUBLICATIONS

Office Action drafted Sep. 21, 2016, issued for the Japanese patent application No. 2014-196601 and English translation thereof.
Office Action drafted Dec. 27, 2016, issued for the Japanese patent application No. 2014-196600 and English translation thereof.

* cited by examiner

BATTERY TERMINAL, FUSE UNIT, AND METHOD FOR MANUFACTURING FUSE UNIT

BACKGROUND

Technical Field

The present invention relates to a battery terminal attached to a battery and relaying power supplied from the battery, a fuse unit, and a method for manufacturing the fuse unit.

Related Art

Conventionally, power supply in a vehicle from a battery to a circuit is often performed via a battery terminal (e.g., refer to JP 2011-187301 A).

FIG. 14 illustrates a fuse unit including an example of a conventional battery terminal. A fuse unit 5 illustrated in FIG. 14 is directly attached to a rod-like electrode 62 projecting from a terminal attaching surface 61 in a battery 6 and includes a battery terminal 51 and a fusible link 52. FIG. 15 illustrates an exploded view of the fuse unit illustrated in FIG. 14.

The battery terminal 51 is a terminal formed approximately in a rectangular shape in a planar view and is provided on a first end side in a longitudinal direction thereof with an electrode insertion hole 511 in which the rod-like electrode 62 of the battery 6 is to be inserted. A second end side in the longitudinal direction thereof is provided with a screw 512 adapted to couple the battery terminal 51 with the fusible link 52. The battery terminal 51 is formed to extend toward an outer edge 61a of the terminal attaching surface 61 at the time of being connected to the rod-like electrode 62 of the battery 6.

The fusible link 52 includes a power feeding terminal 521, two circuit terminals 522, and fusible bodies 523.

The power feeding terminal 521 is connected to the battery terminal 51 and is supplied with power via the battery terminal 51. This power feeding terminal 521 is provided with an insertion hole 521a in which the screw 512 of the battery terminal 51 is to be inserted. A nut 513 is tightened on the screw 512 that has been inserted in this insertion hole 521a to cause the battery terminal 51 to be connected to the power feeding terminal 521.

To the two circuit terminals 522, circuits operated by power from the battery 6 are connected, respectively. Each of the circuit terminals 522 is provided with a screw 522a to which a round terminal or the like of an electric wire of the circuit is to be connected.

The fusible bodies 523 are formed to connect the power feeding terminal 521 to the two respective circuit terminals 522 in strip shapes each of which is narrower than the power feeding terminal 521 and the circuit terminals 522. In each of the circuit terminals 522, power from the battery 6 flows from the power feeding terminal 521 via the fusible body 523. When a current having a threshold value or higher flows, the fusible body 523 fuses to prevent overcurrent from flowing in the circuit.

Also, the fusible link 52 is formed with the power feeding terminal 521, the two circuit terminals 522, and the fusible bodies 523 made of a conductive metal covered with and fixed by (molded with) an insulating resin material. A resin housing 524 made of the insulating resin material covers and fixes respective parts of the power feeding terminal 521, the circuit terminals 522, and the fusible bodies 523 in a state in which respective connecting surfaces of the power feeding terminal 521 and the circuit terminals 522 are exposed, and in which windows 524a are provided to enable fusing of the fusible bodies 523 to be visually recognized. Each window 524a for visually recognizing fusing is covered with a transparent cover 525, and fusing of the fusible body 523 can be visually recognized through this transparent cover 525.

Here, in the above battery terminal 51, an area around a part with which another part such as the fusible link 52 is coupled easily receives load resulting from a part weight and the like. Depending on the degree of the load, the battery terminal 51 may require higher strength.

Also, in recent years, with the advancement of space saving of a vehicle, a spatial margin around a battery mounted therein is being reduced. On the other hand, in the fuse unit 5 illustrated in FIGS. 14 and 15, the length from the electrode insertion hole 511 in which the rod-like electrode 62 is to be inserted to the circuit terminals 522 tends to be long. Accordingly, depending on the position of the rod-like electrode 62 in the battery 6, the fuse unit 5 may protrude significantly to the periphery of the battery 6, which can make it difficult to attach the fuse unit 5 to the battery 6.

The present invention takes the above problems into consideration, and an object of the present invention is to provide a battery terminal with heightened strength. Another object of the present invention is to provide a fuse unit enabling protrusion when attached to a battery to be restricted and a method for manufacturing such a fuse unit.

SUMMARY

To solve the above problems, the invention according to a first aspect provides a battery terminal including: a terminal main body provided in opposed plates thereof as a pair, formed by folding approximately in a U shape a strip plate made of a conductive metal, respectively with electrode insertion holes in which a rod-like electrode projecting from a terminal attaching surface in a battery is sequentially inserted, and formed to extend toward an outer edge of the terminal attaching surface at time of being connected to the rod-like electrode; and a joint joining the opposed plates as the pair in a state in which the opposed plates surface-contact and overlap each other on an opposite side of a folded part as seen from the electrode insertion hole.

The invention according to a second aspect provides the battery terminal according to the first aspect, wherein the joint is formed by means of insert molding to cover and fix the opposed plates as the pair with an insulating resin material together on the opposite side.

The invention according to a third aspect provides the battery terminal according to the second aspect, further including: a circuit terminal connected to a circuit operated by power from the battery; and a fusible body connecting the terminal main body to the circuit terminal in a strip shape which is narrower than the terminal main body and the circuit terminal and fusing when current having a threshold value or higher flows, wherein the terminal main body, the circuit terminal, and the fusible body are integrally cut out from a single conductive metal plate and formed, and wherein the joint is formed by covering and fixing respective parts of the circuit terminal and the fusible body with the insulating resin material so that a connecting surface to the circuit in the circuit terminal may be exposed, and so that fusing of the fusible body can be visually recognized.

The invention according to a fourth aspect provides the battery terminal according to the third aspect, wherein the fusible body extends only in an intersecting direction, which intersects with an extending direction of the terminal main body, and which is approximately parallel to the terminal attaching surface, or extends both in the extending direction and in the intersecting direction so that a part extending in the extending direction may be shorter.

The invention according to a fifth aspect provides the battery terminal according to the first aspect, wherein a first opposed plate out of the opposed plates as the pair has the opposite side formed in a flat plate shape, and wherein a second opposed plate out of the opposed plates as the pair has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

The invention according to a sixth aspect provides the battery terminal according to the second aspect, wherein a first opposed plate out of the opposed plates as the pair has the opposite side formed in a flat plate shape, and wherein a second opposed plate out of the opposed plates as the pair has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

The invention according to a seventh aspect provides the battery terminal according to the third aspect, wherein a first opposed plate out of the opposed plates as the pair has the opposite side formed in a flat plate shape, and wherein a second opposed plate out of the opposed plates as the pair has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

The invention according to an eighth aspect provides the battery terminal according to the fourth aspect, wherein a first opposed plate out of the opposed plates as the pair has the opposite side formed in a flat plate shape, and wherein a second opposed plate out of the opposed plates as the pair has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

Further, to solve the above problems, a ninth aspect of the present invention provides a fuse unit including: a battery terminal connected at or around a first end thereof to a rod-like electrode projecting from a terminal attaching surface in a battery and extending toward a second end thereof to an outer edge of the terminal attaching surface; a circuit terminal connected to a circuit operated by power from the battery; and a fusible body connecting the battery terminal to the circuit terminal in a strip shape which is narrower than the battery terminal and the circuit terminal and fusing when current having a threshold value or higher flows, wherein the fusible body extends only in an intersecting direction, which intersects with an extending direction of the battery terminal, and which is approximately parallel to the terminal attaching surface, or extends both in the extending direction and in the intersecting direction so that a part extending in the extending direction may be shorter, and wherein the battery terminal, the circuit terminal, and the fusible body are integrally cut out from a single conductive metal plate and formed.

The invention according to a tenth aspect provides the fuse unit according to the ninth aspect, wherein the battery terminal is provided in opposed plates thereof as a pair, formed by folding a strip plate approximately in a U shape, respectively with electrode insertion holes in which the rod-like electrode is sequentially inserted, and is formed, after being cut out in a developed shape from the single plate, by folding a second opposed plate out of the opposed plates as the pair to head for a first opposed plate out of the opposed plates as the pair, while keeping the first opposed plate out of the opposed plates as the pair still, and wherein the fusible body is cut out integrally with the first opposed plate and formed continuously with the first opposed plate.

The invention according to an eleventh aspect provides the fuse unit according to the ninth aspect, wherein the circuit terminal is arranged adjacent to the battery terminal in the intersecting direction.

The invention according to a twelfth aspect provides the fuse unit according to the eleventh aspect, wherein the fusible body extends in the intersecting direction from the battery terminal at a forward position in the extending direction away from the circuit terminal, is then bent backward in the extending direction, and extends to the circuit terminal.

The invention according to a thirteenth aspect provides the fuse unit according to the tenth aspect, wherein the circuit terminal is arranged adjacent to the battery terminal in the intersecting direction.

The invention according to a fourteenth aspect provides the fuse unit according to the thirteenth aspect, wherein the fusible body extends in the intersecting direction from the battery terminal at a forward position in the extending direction away from the circuit terminal, is then bent backward in the extending direction, and extends to the circuit terminal.

Further, to solve the above problems, a fifteenth aspect of the present invention provides a method for manufacturing a fuse unit including: a battery terminal connected at or around a first end thereof to a rod-like electrode projecting from a terminal attaching surface in a battery and extending toward a second end thereof to an outer edge of the terminal attaching surface; a circuit terminal connected to a circuit operated by power from the battery; and a fusible body connecting the battery terminal to the circuit terminal in a strip shape which is narrower than the battery terminal and the circuit terminal and fusing when current having a threshold value or higher flows, wherein, in the fuse unit, the fusible body extends only in an intersecting direction, which intersects with an extending direction of the battery terminal, and which is approximately parallel to the terminal attaching surface, or extends both in the extending direction and in the intersecting direction so that a part extending in the extending direction may be shorter, the method including: a cutting process for integrally cutting out the battery terminal, the circuit terminal, and the fusible body from a single conductive metal plate.

The invention according to a sixteenth aspect provides the method for manufacturing a fuse unit according to the fifteenth aspect, wherein the cutting process includes a first cutting process for integrally cutting out a wide plate portion including the fusible body and wider than the fusible body, the battery terminal, and the circuit terminal from the single plate and a second cutting process for cutting the fusible body from the wide plate portion, and further including: a plating process for plating the battery terminal, the circuit terminal, and the wide plate portion after the first cutting process and before the second cutting process.

The invention according to a seventeenth aspect provides the method for manufacturing a fuse unit according to the fifteenth aspect, wherein the battery terminal is provided in opposed plates thereof as a pair, formed by folding a strip plate approximately in a U shape, respectively with electrode insertion holes in which the rod-like electrode is sequentially inserted, and is formed, after being cut out in a developed shape from the single plate, by folding a second opposed plate out of the opposed plates as the pair to head for a first opposed plate out of the opposed plates as the pair, while keeping the first opposed plate still out of the opposed plates as the pair, and wherein the fusible body is cut out integrally with the first opposed plate and formed continuously with the first opposed plate.

The invention according to an eighteenth aspect provides the method for manufacturing a fuse unit according to the fifteenth aspect, wherein the circuit terminal is arranged adjacent to the battery terminal in the intersecting direction.

The invention according to a nineteenth aspect provides the method for manufacturing a fuse unit according to the eighteenth aspect, wherein the fusible body extends in the intersecting direction from the battery terminal at a forward position in the extending direction away from the circuit terminal, is then bent backward in the extending direction, and extends to the circuit terminal.

According to the invention described in the first aspect, the opposed plates as the pair are joined in the state in which the opposed plates surface-contact and overlap each other on the opposite side of the folded part as seen from the electrode insertion hole. Accordingly, even when an area around the opposite part of the folded part receives load such as a part weight, the load is supported by the opposed plates as the pair separately. In other words, according to the aspect of the present invention described in the first aspect, the battery terminal can be heightened in strength against the load applied around an end portion as described above.

Also, according to the second aspect of the invention, the opposed plates as the pair are covered with and fixed by (molded with) the insulating resin material together by means of the insert molding on the opposite side. Accordingly, the opposed plates as the pair can be joined further strongly. Also, since the molding insulating resin material itself functions to support the load, strength of the battery terminal can further be heightened.

Also, according to the third aspect of the invention, the fuse-integrated battery terminal is achieved which is provided with a fuse function and which is reduced in size by integrally cutting out the terminal main body, the circuit terminal, and the fusible body from the single conductive metal plate. Also, molding of the pair of opposed plates is performed with use of the insulating resin material which molds parts of the circuit terminal and the fusible body. Accordingly, molding of the pair of opposed plates and molding of the circuit terminal and the fusible body can be performed by means of one insert molding process, which enables manufacturing cost to be reduced.

Also, according to the fourth aspect of the invention, the fuse-integrated battery terminal can further be reduced in size due to the above shape of the fusible body.

Also, according to the fifth to eighth aspects of the invention, the first opposed plate out of the opposed plates as the pair is formed in the flat plate shape while the second opposed plate is formed in the step-like bent shape. Thus, the terminal main body has different shapes on the front and back surfaces. For example, when the terminal main body is arranged in a mold for the insert molding, erroneous arrangement in which the front and back surfaces are erroneously arranged in terms of the directions can be prevented from occurring. Also, an insert molding machine can be positioned at a setting position with reference to the step-like bent part.

Also, according to the ninth to fifteenth aspects of the invention, the fusible body extends only in the intersecting direction, which intersects with the extending direction of the battery terminal, which heads for the outer edge of the terminal attaching surface in the battery, or extends both in the extending direction and in the intersecting direction so that the part extending in the extending direction may be shorter. This restricts a dimension of the fusible body in the extending direction heading for the outer edge of the terminal attaching surface. Also, since the battery terminal, the circuit terminal, and the fusible body are integrally cut out from the single conductive metal plate and formed, a part adapted to couple the battery terminal, such as the power feeding terminal 521 illustrated in FIGS. 14 and 15, is dispensed with. Accordingly, a dimension of the fuse unit in the extending direction heading for the outer edge of the terminal attaching surface is reduced, and as a result, protrusion when the fuse unit is attached to the battery can be restricted.

Also, according to the tenth to seventeenth aspects of the invention, since the battery terminal is formed so that the opposed plates as the pair formed by folding approximately in the U shape the strip plate may be respectively provided with the electrode insertion holes in which the rod-like electrode is to be inserted, stability of attachment of the battery terminal (that is, the fuse unit) to the rod-like electrode is improved. Further, since the fusible body is cut out integrally with the first opposed plate and formed continuously with the first opposed plate, when this battery terminal is formed to be folded by means of a process such as pressing so that the second opposed plate out of the opposed plates as the pair may head for the first opposed plate out of the opposed plates as the pair while the first opposed plate may be kept still, load to be applied to the fusible body at the time of the folding process such as vibration can be restricted.

Also, according to the eleventh, thirteenth, and eighteenth aspects of the invention, the circuit terminal is arranged adjacent to the battery terminal in the intersecting direction. Accordingly, a dimension of the fuse unit can further be reduced in the extending direction of the battery terminal, and as a result, protrusion when the fuse unit is attached to the battery can further be restricted.

Also, according to the twelfth, fourteenth, and nineteenth aspects of the invention, the fusible body extends in the intersecting direction from the battery terminal, is then bent backward in the extending direction, and extends to the circuit terminal arranged adjacent to the battery terminal in the intersecting direction. The fusible body needs to have certain length to obtain a resistance value required for fusing. By employing the aforementioned bent shape, the fusible body can be formed to have sufficient length without significantly separating the battery terminal from the circuit terminal in the intersecting direction. Accordingly, a dimension of the fuse unit in the intersecting direction of the battery terminal can also be reduced.

Also, according to the sixteenth aspect of the invention, the second cutting process for cutting the fusible body from the wide plate portion is executed after the plating process. Accordingly, an event such as deformation of the fusible body during plating can be prevented even without care of treating the fusible body at the time of the plating process, and barrel plating (also referred to as rotation plating) for rotating a plating bath containing a plurality of target parts to perform plating inexpensively can thus be employed as the plating process.

DETAILED DESCRIPTION

Figure 1:
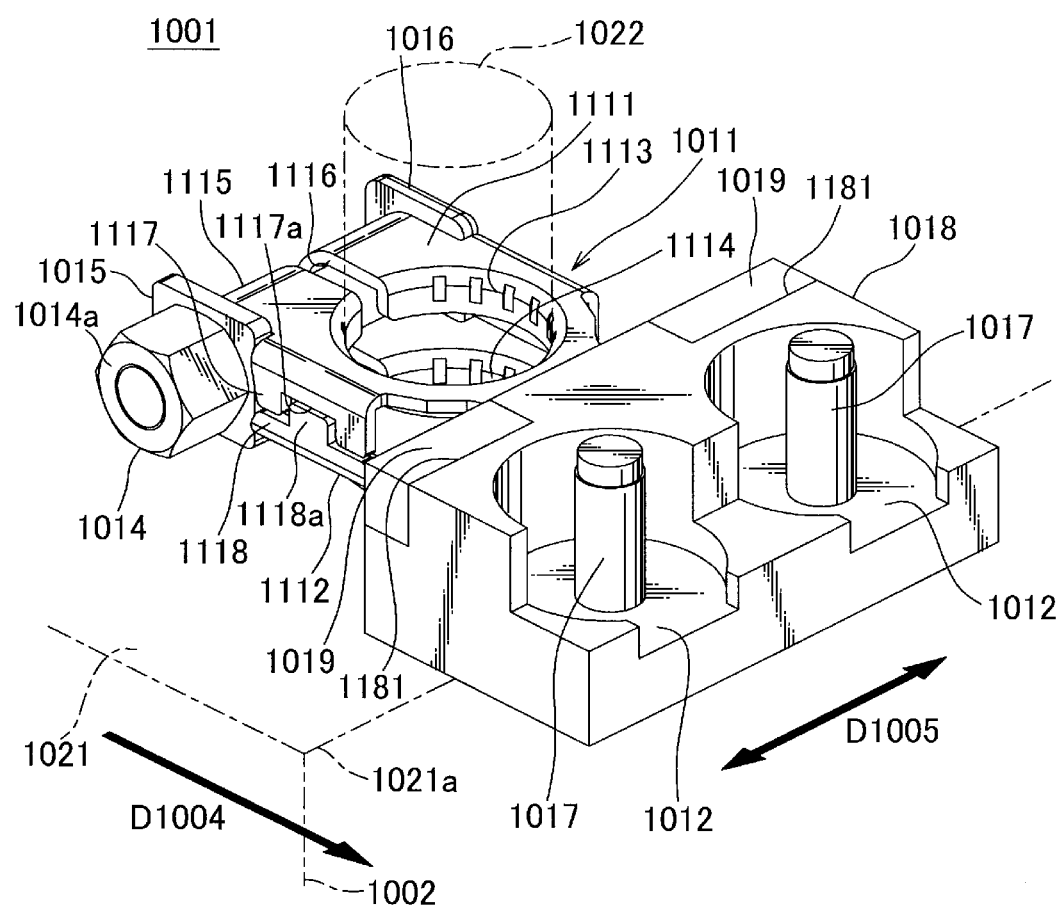
FIG. 1 is a perspective view of a battery terminal according to a first embodiment.
Figure 2A:
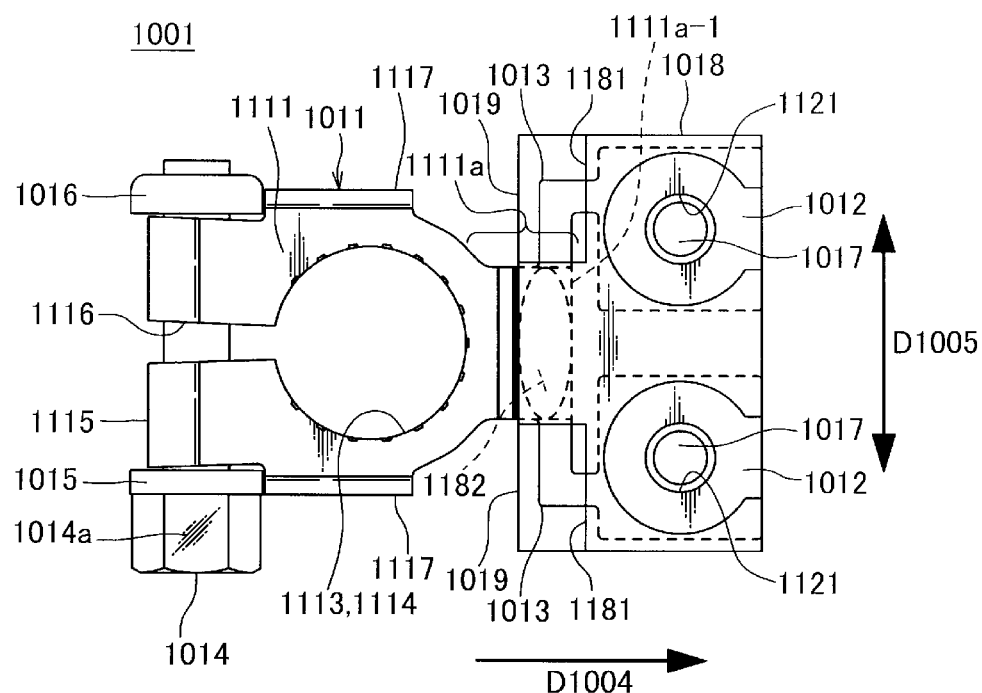
FIGS. 2A and 2B are a plan view and a side view of the battery terminal illustrated in FIG. 1.
Figure 2B:
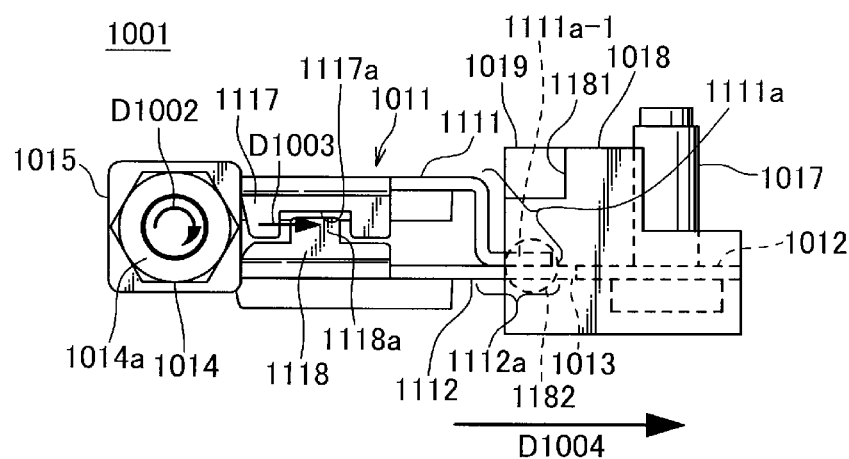
Figure 3:
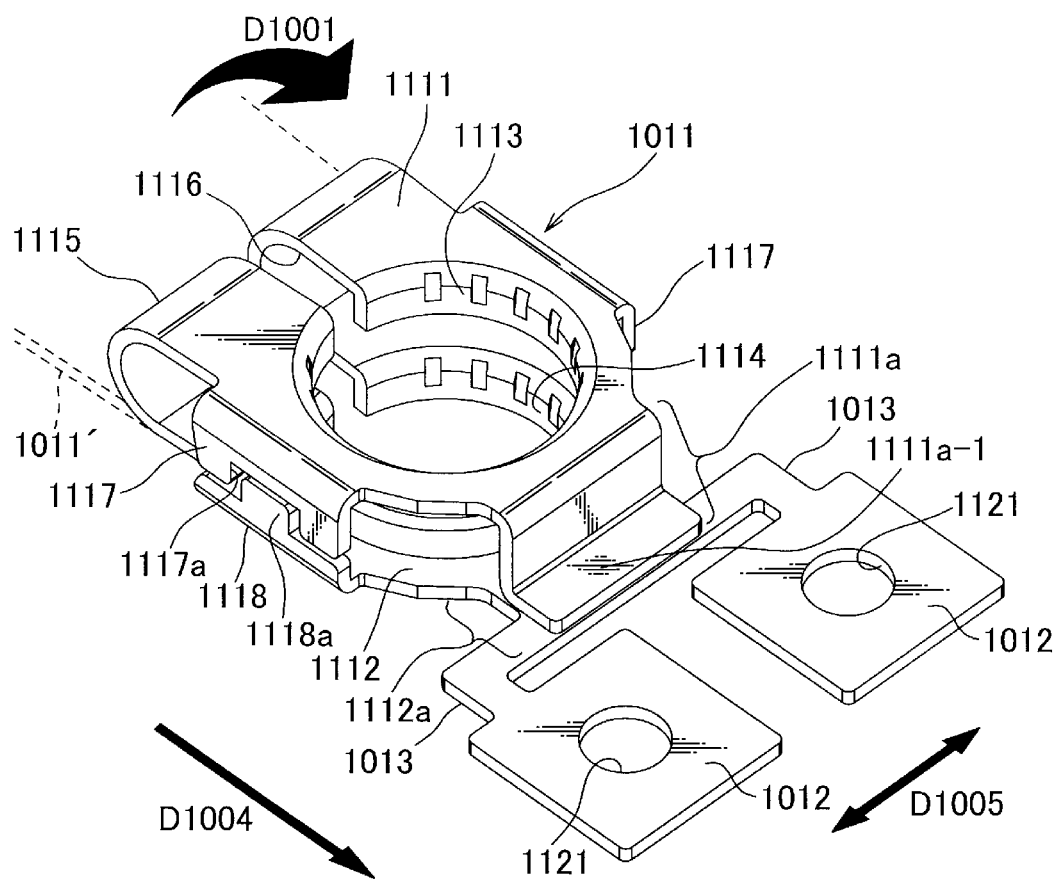
FIG. 3 is a perspective view of a structure including a terminal main body, circuit terminals, and fusible bodies of the battery terminal illustrated in FIG. 1.
Figure 4A:
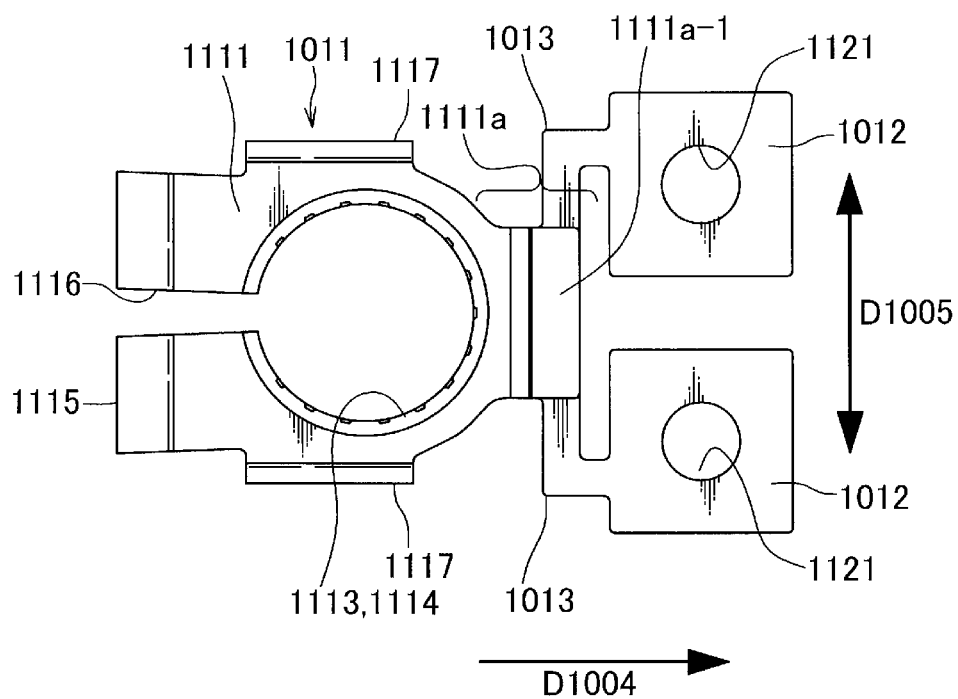
FIGS. 4A and 4B are a plan view and a side view of the structure illustrated in FIG. 3.
Figure 4B:
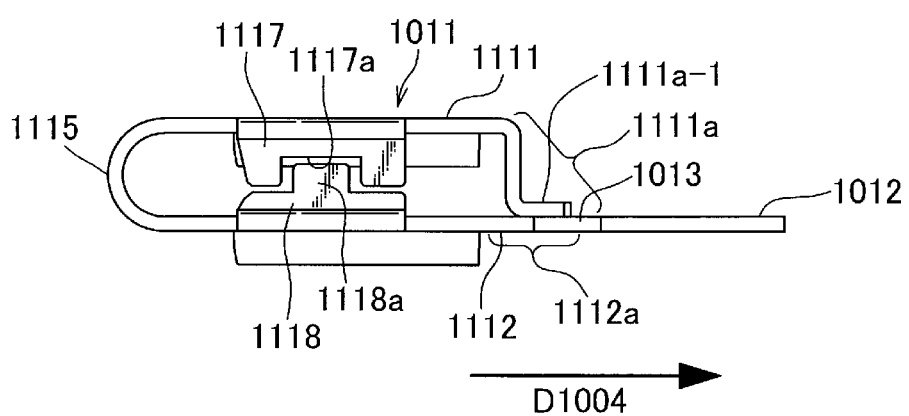

A battery terminal according to a first embodiment of the present invention will be described with reference to FIGS. 1 to 4B. FIG. 1 is a perspective view of a battery terminal according to the first embodiment, and FIGS. 2A and 2B are a plan view and a side view of the battery terminal illustrated in FIG. 1. FIG. 2A is the plan view, and FIG. 2B is the side view. Also, FIG. 3 is a perspective view of a structure including a terminal main body, circuit terminals, and fusible bodies of the battery terminal illustrated in FIG. 1, and FIGS. 4A and 4B are a plan view and a side view of the structure illustrated in FIG. 3. FIG. 4A is the plan view, and FIG. 4B is the side view.

A battery terminal 1001 according to the present embodiment is directly attached to a rod-like electrode 1022 projecting from a terminal attaching surface 1021 in a battery 1002 and includes a terminal main body 1011, circuit terminals 1012, and fusible bodies 1013.

The terminal main body 1011 is formed to extend toward an outer edge 1021a of the terminal attaching surface 1021 at the time of being connected to the rod-like electrode 1022. As illustrated in FIG. 3, opposed plates 1111 and 1112 as a pair, formed by folding approximately in a U shape a strip plate 1011' made of a conductive metal, are respectively provided with electrode insertion holes 1113 and 1114 in which the rod-like electrode 1022 is sequentially inserted, to form the terminal main body 1011. Meanwhile, in this terminal main body 1011, while the first opposed plate 1112 located on a lower side in FIG. 3 out of the opposed plates 1111 and 1112 as the pair is kept still, the second opposed plate 1111 is folded in a direction of an arrow D1001 to head for the first opposed plate 1112 as illustrated in FIG. 3.

This terminal main body 1011 is provided with a slit 1116 residing from the electrode insertion hole 1114 in the first opposed plate 1112 via a U-shaped folded part 1115 through the electrode insertion hole 1113 in the second opposed plate 1111. Each of the electrode insertion holes 1114 and 1113 is reduced in diameter by shrinking a width of this slit 1116, and a tightening screw 1014 for shrinking the width of the slit 1116 is arranged inside the folded part 1115 in the terminal main body 1011. A square washer 1015 is arranged between a screw head 1014a of the tightening screw 1014 and the folded part 1115, and a tip end of the tightening screw 1014 is screwed in a nut 1016 arranged with the folded part 1115 interposed between the nut 1016 and the square washer 1015. When the tightening screw 1014 is tightened, a distance between the square washer 1015 and the nut 1016 is reduced, and the width of the slit 1116 is thus reduced, to cause the electrode insertion holes 1113 and 1114 to be reduced in diameter.

In the terminal main body 1011, the tightening screw 1014 is tightened in a state in which the rod-like electrode 1022 is inserted in the electrode insertion holes 1113 and 1114, and the electrode insertion holes 1113 and 1114 are reduced in diameter, to obtain mechanical fixing and electric connection to the rod-like electrode 1022. In the terminal main body 1011 attached in this manner, the first opposed plate 1112 is opposed to the terminal attaching surface 1021 of the battery 1002.

Also, in the terminal main body 1011, on a side surface thereof, a sidewall 1117 is folded up from the second opposed plate 1111 to the first opposed plate 1112, and a sidewall 1118 is folded up from the first opposed plate 1112 to the second opposed plate 1111. The sidewall 1117 of the second opposed plate 1111 is provided with a recess 1117a while the sidewall 1118 of the first opposed plate 1112 is provided with a protrusion 1118a to be inserted into the recess 1117a. As illustrated in FIG. 2B, when the tightening screw 1014 is tightened in a direction of an arrow D1002, the square washer 1015 is about to turn in the same direction. At this time, the sidewall 1117 of the second opposed plate 1111 functions to prevent turning of the square washer 1015. As a result, this sidewall 1117 is pressed by the square washer 1015 and is trying to move in a direction of an arrow D1003, and the protrusion 1118a of the sidewall 1118 of the first opposed plate 1112 inserting in the recess 1117a of the sidewall 1117 functions to stop the movement. This prevents deformation of the terminal main body 1011 when the tightening screw 1014 is tightened.

Also, in the terminal main body 1011, the first opposed plate 1112 has an opposite part 1112a of the folded part 1115 as seen from the electrode insertion hole 1114 formed in a flat plate shape. The second opposed plate 1111 has an opposite part 1111a of the folded part 1115 as seen from the electrode insertion hole 1113 formed in a step-like bent shape in the following manner. That is, this opposite part 1111a extends parallel to the first opposed plate 1112, is then bent 90° to head for the first opposed plate 1112, is bent 90° again to extend parallel to the first opposed plate 1112, and surface-contacts and overlaps with the first opposed plate 1112 as a parallel portion 1111a-1.

The circuit terminal 1012 is a square plate made of a conductive metal arranged approximately parallel to the terminal attaching surface 1021 of the battery 1002 and is provided at a center thereof with an insertion hole 1121 in which a connection screw 1017, adapted to connect a not-illustrated circuit operated by power from the battery 1002 to this circuit terminal 1012, is to be inserted. In the present embodiment, the two circuit terminals 1012 are provided. The two circuit terminals 1012 are arranged to be approximately coplanar with the first opposed plate 1112 in the terminal main body 1011. The two circuit terminals 1012 are also arranged ahead of the terminal main body 1011 in an extending direction D1004, in which the terminal main body 1011 extends toward the outer edge 1021a of the terminal attaching surface 1021, to be arrayed in an intersecting direction D1005, which intersects with the extending direction D1004, and which is approximately parallel to the terminal attaching surface 1021. In each of the circuit terminals 1012, a round terminal or the like attached to a tip end of an electric wire extending from the not-illustrated circuit inserts the connection screw 1017 therein to establish connection by means of nut tightening.

The two fusible bodies 1013 are provided to connect the terminal main body 1011 to the two respective circuit terminals 1012 in strip shapes each of which is narrower than the terminal main body 1011 and the circuit terminals 1012. When current having a threshold value or higher flows, each of the fusible bodies 1013 fuses. Also, each of the fusible bodies 1013 first extends in the intersecting direction D1005 from an end portion of the terminal main body 1011 on a side of the circuit terminal 1012, is then bent approximately 90°, and extends forward in the extending direction D1004 to the circuit terminal 1012. In each of the fusible bodies 1013, a part extending in the extending direction D1004 is formed to be shorter than a part extending in the intersecting direction D1005.

Also, as described above with reference to FIG. 3, in the present embodiment, the second opposed plate 1111 located on an upper side in FIG. 3 out of the opposed plates 1111 and 1112 as the pair is folded in the direction of the arrow D1001 to head for the first opposed plate 1112. The two fusible bodies 1013 are provided to be continuous with the first opposed plate 1112.

In the battery terminal 1001 according to the present embodiment, the terminal main body 1011, the two circuit terminals 1012, and the fusible bodies 1013 are integrally cut out from a single conductive metal plate and formed.

Also, the battery terminal 1001 is formed with the end portion of the terminal main body 1011 on the side of the fusible bodies 1013, the two circuit terminals 1012, and the fusible bodies 1013 covered with and fixed by (molded with) an insulating resin material. A resin housing 1018 made of the insulating resin material covers and fixes respective parts of the end portion of the terminal main body 1011 on the side of the fusible bodies 1013, the two circuit terminals 1012, and the fusible bodies 1013 in a state in which respective connecting surfaces of the circuit terminals 1012 are exposed, and in which windows 1181 are provided to enable fusing of the fusible bodies 1013 to be visually recognized. This resin housing 1018 is formed integrally with the terminal main body 1011, the two circuit terminals 1012, and the fusible bodies 1013 by means of insert molding. Also, this insert molding is performed in a state in which the connection screws 1017 are inserted in the insertion holes 1121 of the circuit terminals 1012. Each window 1181 of the resin housing 1018 for visually recognizing fusing is covered with a transparent cover 1019, and fusing of the fusible body 1013 is visually recognized through this transparent cover 1019.

In the battery terminal 1001 according to the present embodiment, a part of the resin housing 1018 formed by means of the insert molding serves as a joint 1182, in which the opposite parts 1111a and 1112a of the folded part 1115 in the pair of opposed plates 1111 and 1112 are joined in a state of surface-contacting and overlapping with each other. An area around the opposite parts 1111a and 1112a of the folded part 1115 receives load such as a weight of the electric wire of the circuit to be connected to each circuit terminal 1012. At this time, since these parts 1111a and 1112a are joined at the joint 1182 in the state of surface-contacting and overlapping with each other, the above load is supported by the opposed plates 1111 and 1112 as the pair separately. In other words, the battery terminal 1001 according to the present invention is heightened in strength against the above load.

Also, with the battery terminal 1001 according to the present embodiment, the pair of opposed plates 1111 and 1112 is molded at the opposite parts 1111a and 1112a with the insulating resin material together by means of the insert molding. Accordingly, the opposed plates 1111 and 1112 as the pair can be joined further strongly. Also, since the molding insulating resin material itself functions to support the load, strength of the battery terminal 1001 is further heightened.

Also, the battery terminal 1001 according to the present embodiment is provided with a fuse function and is reduced in size since the battery terminal 1001 is formed by integrally cutting out the terminal main body 1011, the circuit terminals 1012, and the fusible bodies 1013 from the single conductive metal plate. Also, molding of the pair of opposed plates 1111 and 1112 is performed with use of the insulating resin material which molds parts of the circuit terminals 1012 and the fusible bodies 1013. Accordingly, molding of the pair of opposed plates 1111 and 1112 and molding of the circuit terminals 1012 and the fusible bodies 1013 can be performed by means of one insert molding process, which enables manufacturing cost to be reduced.

Also, the battery terminal 1001 according to the present embodiment is further reduced in size as a fuse-integrated battery terminal due to the above shapes of the fusible bodies 1013.

Also, with the battery terminal 1001 according to the present embodiment, the first opposed plate 1112 out of the opposed plates 1111 and 1112 as the pair is formed in a flat plate shape while the second opposed plate 1111 is formed in the step-like bent shape. Thus, the terminal main body 1011 has different shapes on the front and back surfaces. For example, when the terminal main body 1011 is arranged in a mold for the insert molding, erroneous arrangement in which the front and back surfaces are erroneously arranged in terms of the directions can be prevented from occurring. Also, an insert molding machine can be positioned at a setting position with reference to the step-like bent part 1111a.

Figure 5:
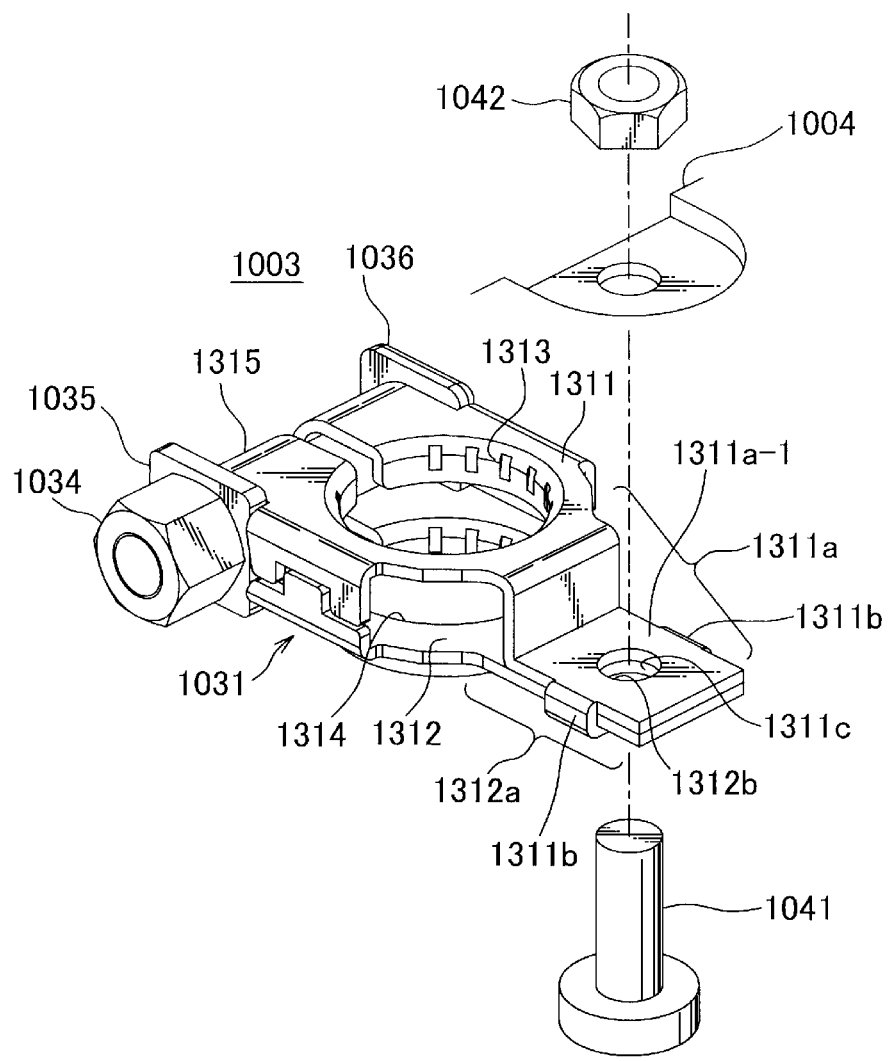
FIG. 5 is a perspective view of a battery terminal according to a second embodiment.
Figure 6A:
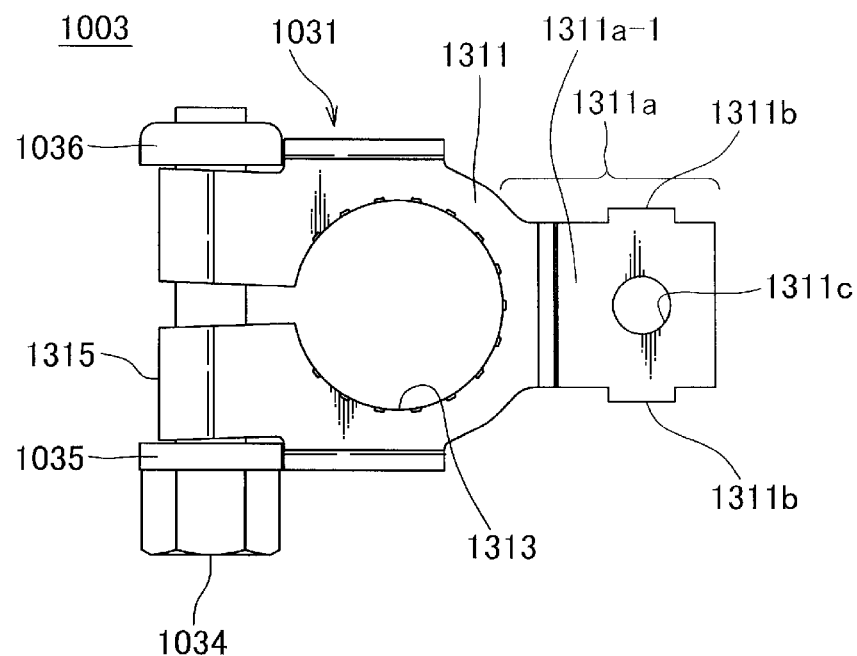
FIGS. 6A and 6B are a plan view and a side view of the battery terminal illustrated in FIG. 5.
Figure 6B:
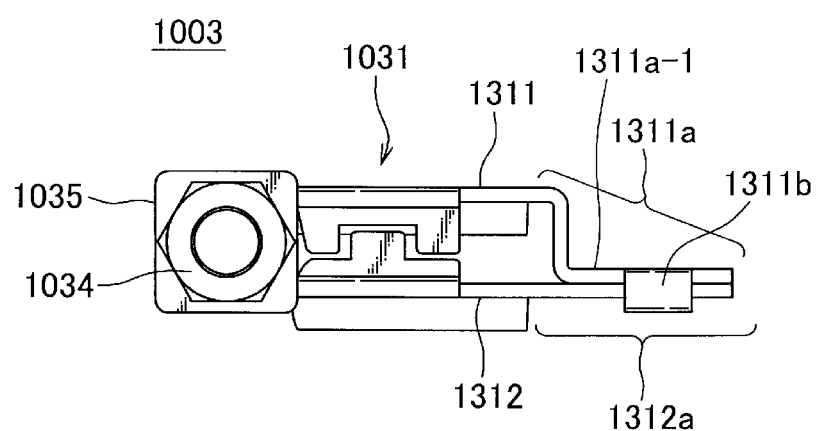

Next, a battery terminal according to a second embodiment of the present invention will be described with reference to FIGS. 5 to 6B. FIG. 5 is a perspective view of a battery terminal according to the second embodiment, and FIGS. 6A and 6B are a plan view and a side view of the battery terminal illustrated in FIG. 5. FIG. 6A is the plan view, and FIG. 6B is the side view.

A battery terminal 1003 according to the second embodiment is provided with no fuse function as in the battery terminal 1001 according to the first embodiment. In a case in which the battery terminal 1003 is provided with a fuse function, the battery terminal 1003 will be coupled with a fusible link 1004 similar to one illustrated in FIGS. 15 and 14 with use of a screw 1041 and a nut 1042.

The battery terminal 1003 includes a terminal main body 1031 in which opposed plates 1311 and 1312 as a pair, formed by folding approximately in a U shape a strip plate made of a conductive metal, are respectively provided with electrode insertion holes 1313 and 1314. The first opposed plate 1312 located on a lower side in FIG. 5 out of the opposed plates 1311 and 1312 as the pair has an opposite part 1312a of the folded part 1315 as seen from the electrode insertion hole 1314 formed in a flat plate shape. The second opposed plate 1311 has an opposite part 1311a of the folded part 1315 as seen from the electrode insertion hole 1313 formed in a step-like bent shape. That is, this opposite part 1311a extends parallel to the first opposed plate 1312, is then bent 90° to head for the first opposed plate 1312, is bent 90° again to extend parallel to the first opposed plate 1312, and surface-contacts and overlaps with the first opposed plate 1312 as a parallel portion 1311a-1.

In the parallel portion 1311a-1, a pair of nails 1311b extending from the second opposed plate 1311 is swaged in a state of holding the first opposed plate 1312. In the present embodiment, the pair of nails 1311b serves as a joint, in which the opposite parts 1311a and 1312a of the folded part 1315 in the pair of opposed plates 1311 and 1312 are joined in a state of surface-contacting and overlapping with each other. Also, this overlapping part is provided with insertion holes 1311c and 1312b in which the screw 1041 is to be inserted.

Also, an attaching structure of the terminal main body 1031 to a not-illustrated rod-like electrode is similar to the attaching structure of the terminal main body 1011 to the rod-like electrode 1022 in the aforementioned first embodiment. To the terminal main body 1031, a tightening screw 1034, a square washer 1035, and a nut 1036 constituting this attaching structure are attached.

It is to be understood that the battery terminal 1003 according to the second embodiment described above is also heightened in strength against load at the part in which the opposed plates 1311 and 1312 as the pair surface-contact and overlap each other.

It is to be noted that the above-described first and second embodiments merely show illustrative embodiments of the present invention, and that the present invention is not limited to these embodiments. That is, the present invention can be modified in various ways and carried out without departing from the spirit of the present invention. Such modification shall be included in the scope of the present invention as long as the modification includes a configuration of the battery terminal according to the present invention.

For example, in the above first embodiment, as an example of the battery terminal according to the present invention, the battery terminal 1001 in which the two circuit terminals are provided, and in which each of the circuit terminals is provided with one fusible body is raised. However, the battery terminal equipped with the fuse function and provided with the circuit terminal and the fusible body is not limited to this embodiment and may be an embodiment in which one or three or more circuit terminals is/are provided, for example. Also, in a case in which a plurality of circuit terminals are provided, each of the plurality of circuit terminals does not need to be provided with the fusible body, and an embodiment in which only circuit terminals connected to circuits required to be protected by fusing are provided with the fusible bodies is available.

Also, as an example of the fusible body "extending both in the extending direction and in the intersecting direction so that the part extending in the extending direction may be shorter" according to the present invention, the first embodiment illustrates the L-shaped fusible body 1013 bent 90° in the middle. However, the fusible body according to the present invention is not limited to this and may be one formed in a meandering shape, for example, as long as the part extending in the extending direction is shorter.

Also, as an example of the joint according to the present invention, the joint 1182 as a part of the resin housing 1018 formed by means of the insert molding is illustrated in the first embodiment, and the pair of nails 1311b serving as the joint by means of swaging is illustrated in the second embodiment. However, the "joint" according to the present invention is not limited to these and may be a welded part in which the opposed plates as the pair are joined by means of spot welding, adhesive joining the opposed plates as the pair, or a rivet or the like joining the opposed plates as the pair. No specific joining method is questioned here.

Also, in the first embodiment, as an example of the circuit terminal according to the present invention, the square-plate-shaped circuit terminal 1012 arranged approximately parallel to the terminal attaching surface 1021 of the battery 1002 is raised. However, the circuit terminal according to the present invention may be one arranged approximately parallel to a side surface of the battery perpendicular to the terminal attaching surface, one bent in an L shape, or the like. That is, in the circuit terminal according to the present invention, no specific arrangement or shape thereof is questioned as long as the circuit terminal is a terminal to which a circuit operated by power from a battery is connected.

Figure 7:
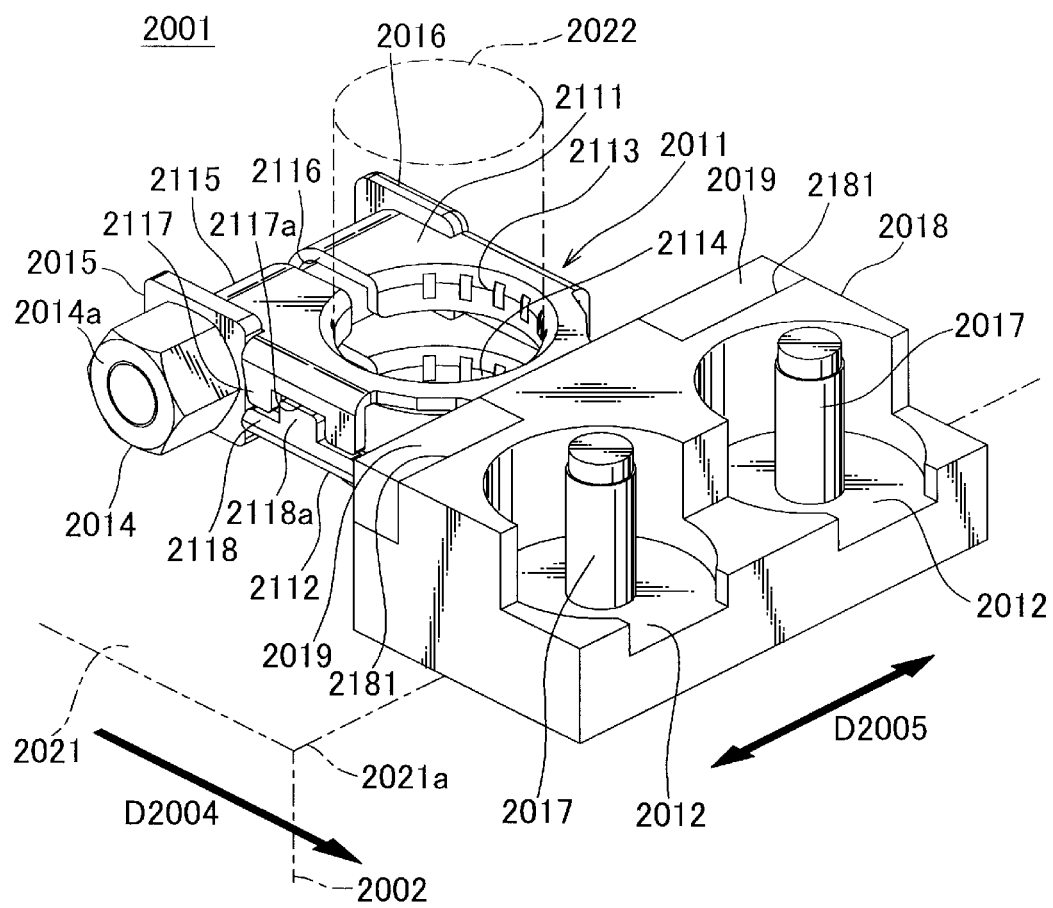
FIG. 7 is a perspective view of a fuse unit according to a third embodiment.
Figure 8A:
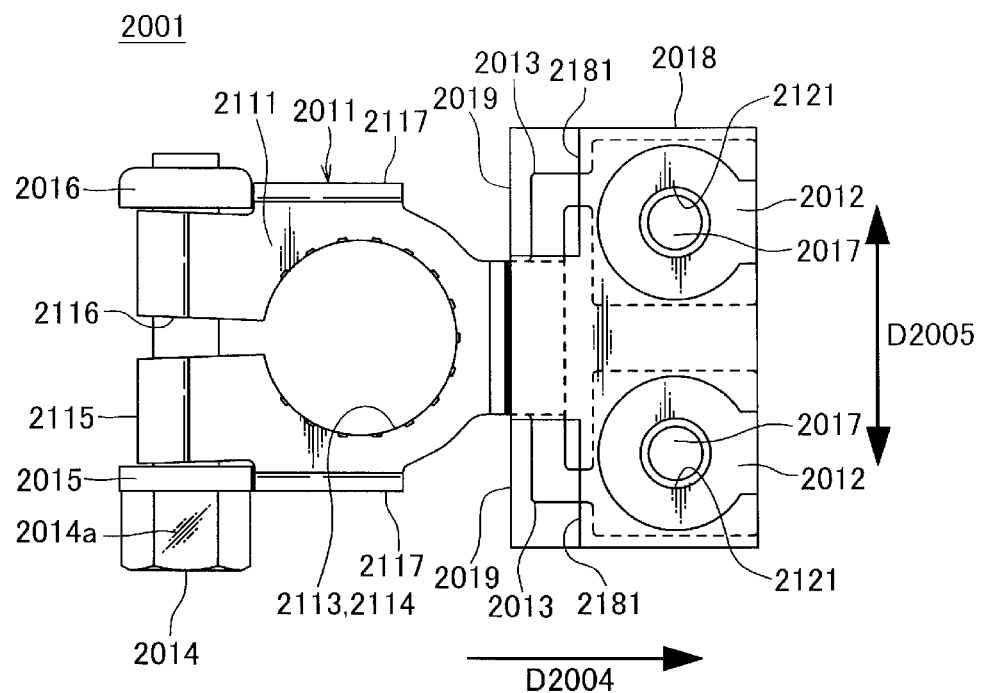
FIGS. 8A and 8B are a plan view and a side view of the fuse unit illustrated in FIG. 7.
Figure 8B:
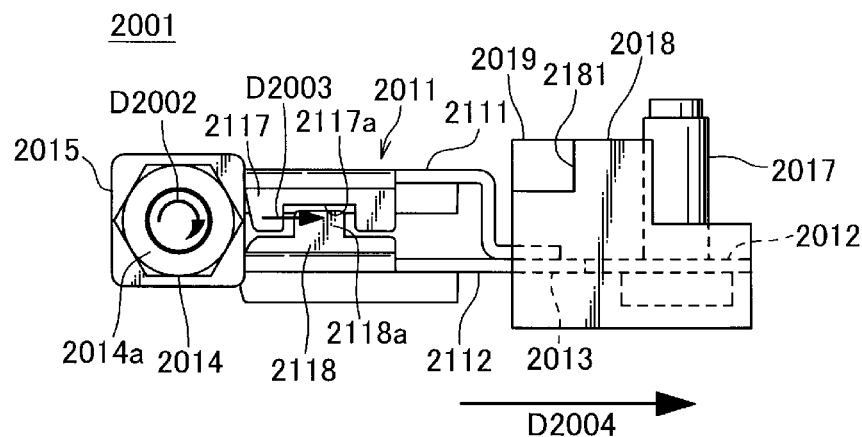
Figure 9:
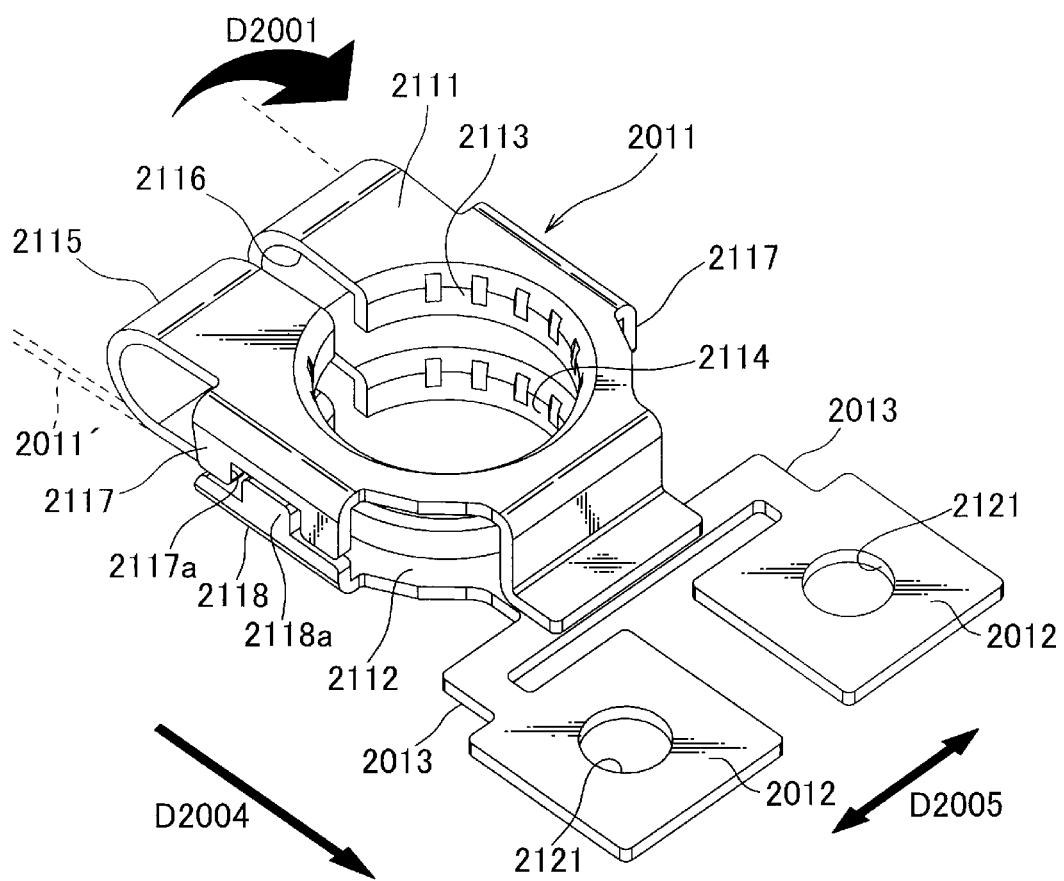
FIG. 9 is a perspective view of a structure including a battery terminal, circuit terminals, and fusible bodies of the fuse unit illustrated in FIG. 7.
Figure 10A:
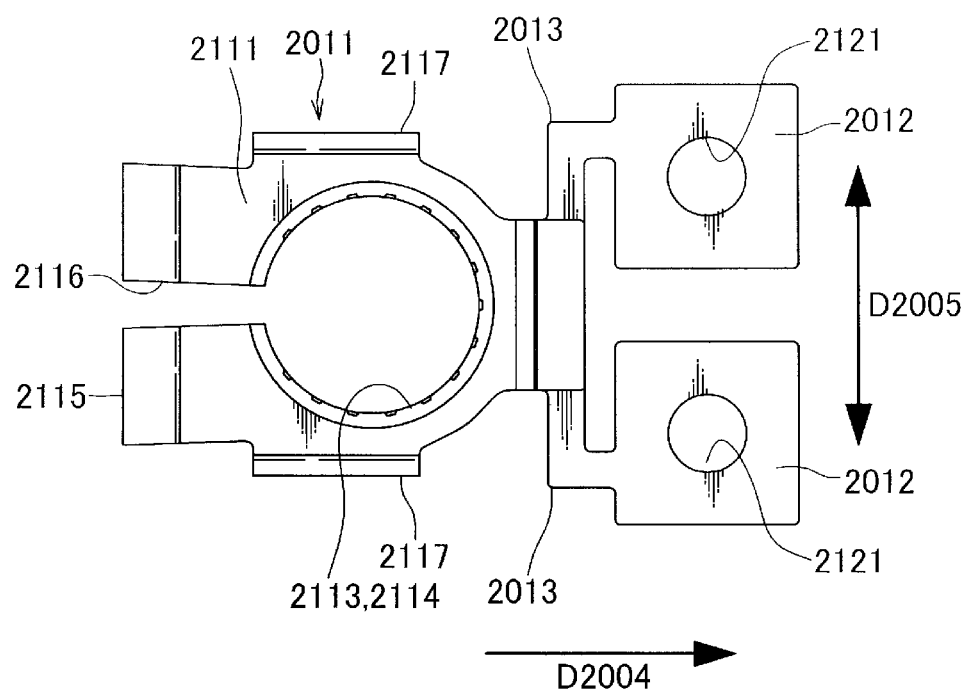
FIGS. 10A and 10B are a plan view and a side view of the structure illustrated in FIG. 9.
Figure 10B:
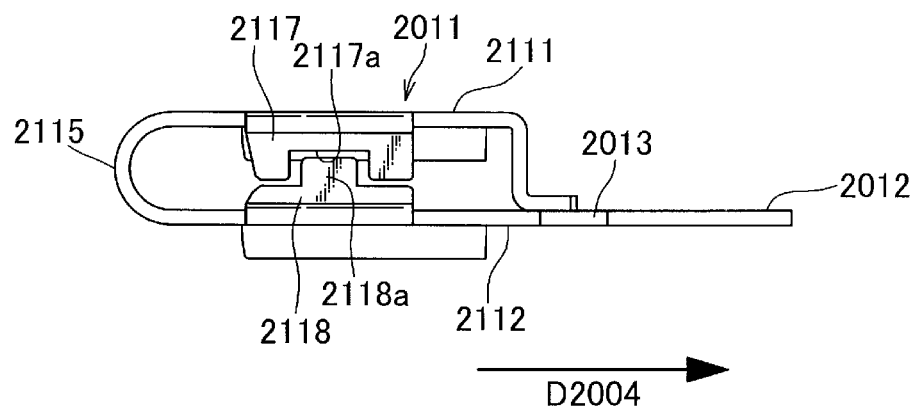

Next, a fuse unit according to a third embodiment of the present invention will be described with reference to FIGS. 7 to 10B. FIG. 7 is a perspective view of a fuse unit according to the third embodiment, and FIGS. 8A and 8B are a plan view and a side view of the fuse unit illustrated in FIG. 7. FIG. 8A is the plan view, and FIG. 8B is the side view. Also, FIG. 9 is a perspective view of a structure including a battery terminal, circuit terminals, and fusible bodies of the fuse unit illustrated in FIG. 7, and FIGS. 10A and 10B are a plan view and a side view of the structure illustrated in FIG. 9. FIG. 10A is the plan view, and FIG. 10B is the side view.

A fuse unit 2001 according to the present embodiment is directly attached to a rod-like electrode 2022 projecting from a terminal attaching surface 2021 in a battery 2002 and includes a battery terminal 2011, circuit terminals 2012, and fusible bodies 2013.

The battery terminal 2011 is connected around a first end thereof to the rod-like electrode 2022 projecting from the terminal attaching surface 2021 in the battery 2002 and extends toward a second end thereof to an outer edge 2021a of the terminal attaching surface 2021. As illustrated in FIG. 9, opposed plates 2111 and 2112 as a pair, formed by folding approximately in a U shape a strip plate 2011' made of a conductive metal, are respectively provided with electrode insertion holes 2113 and 2114 in which the rod-like electrode 2022 is sequentially inserted, to form the battery terminal 2011. Meanwhile, in this battery terminal 2011, while the first opposed plate 2112 located on a lower side in FIG. 9 out of the opposed plates 2111 and 2112 as the pair is kept still, the second opposed plate 2111 is folded in a direction of an arrow D2001 to head for the first opposed plate 2112 as illustrated in FIG. 9.

This battery terminal 2011 is provided with a slit 2116 residing from the electrode insertion hole 2114 in the first opposed plate 2112 via a U-shaped folded part 2115 through the electrode insertion hole 2113 in the second opposed plate 2111. Each of the electrode insertion holes 2113 and 2114 is reduced in diameter by shrinking a width of this slit 2116, and a tightening screw 2014 for shrinking the width of the slit 2116 is arranged inside the folded part 2115 in the battery terminal 2011. A square washer 2015 is arranged between a screw head 2014*a* of the tightening screw 2014 and the folded part 2115, and a tip end of the tightening screw 2014 is screwed in a nut 2016 arranged with the folded part 2115 interposed between the nut 2016 and the square washer 2015. When the tightening screw 2014 is tightened, a distance between the square washer 2015 and the nut 2016 is reduced, and the width of the slit 2116 is thus reduced, to cause the electrode insertion holes 2113 and 2114 to be reduced in diameter.

In the battery terminal 2011, the tightening screw 2014 is tightened in a state in which the rod-like electrode 2022 is inserted in the electrode insertion holes 2113 and 2114, and the electrode insertion holes 2113 and 2114 are reduced in diameter, to obtain mechanical fixing and electric connection to the rod-like electrode 2022. In the battery terminal 2011 attached in this manner, the first opposed plate 2112 is opposed to the terminal attaching surface 2021 of the battery 2002.

Also, in the battery terminal 2011, on a side surface thereof, a sidewall 2117 is folded up from the second opposed plate 2111 to the first opposed plate 2112, and a sidewall 2118 is folded up from the first opposed plate 2112 to the second opposed plate 2111. The sidewall 2117 of the second opposed plate 2111 is provided with a recess 2117*a* while the sidewall 2118 of the first opposed plate 2112 is provided with a protrusion 2118*a* to be inserted into the recess 2117*a*. As illustrated in FIG. 8B, when the tightening screw 2014 is tightened in a direction of an arrow D2002, the square washer 2015 is about to turn in the same direction. At this time, the sidewall 2117 of the second opposed plate 2111 functions to prevent turning of the square washer 2015. As a result, this sidewall 2117 is pressed by the square washer 2015 and is about to move in a direction of an arrow D2003, and the protrusion 2118*a* of the sidewall 2118 of the first opposed plate 2112 inserting in the recess 2117*a* of the sidewall 2117 functions to stop the movement. This prevents deformation of the battery terminal 2011 when the tightening screw 2014 is tightened.

The circuit terminal 2012 is a square plate made of a conductive metal arranged approximately parallel to the terminal attaching surface 2021 of the battery 2002 and is provided at a center thereof with an insertion hole 2121 in which a connection screw 2017, adapted to connect a not-illustrated circuit operated by power from the battery 2002 to this circuit terminal 2012, is to be inserted. In the present embodiment, the two circuit terminals 2012 are provided. The two circuit terminals 2012 are arranged to be approximately coplanar with the first opposed plate 2112 in the battery terminal 2011. The two circuit terminals 2012 are also arranged ahead of the battery terminal 2011 in an extending direction D2004, in which the battery terminal 2011 extends toward the outer edge 2021*a* of the terminal attaching surface 2021, to be arrayed in an intersecting direction D2005, which intersects with the extending direction D2004, and which is approximately parallel to the terminal attaching surface 2021. In each of the circuit terminals 2012, a round terminal or the like attached to a tip end of an electric wire extending from the not-illustrated circuit inserts the connection screw 2017 therein to establish connection by means of nut tightening.

The two fusible bodies 2013 are provided to connect the battery terminal 2011 to the two respective circuit terminals 2012 in strip shapes each of which is narrower than the battery terminal 2011 and the circuit terminals 2012. When current having a threshold value or higher flows, each of the fusible bodies 2013 fuses. Also, each of the fusible bodies 2013 first extends in the intersecting direction D2005 from an end portion of the battery terminal 2011 on a side of the circuit terminal 2012, is then bent approximately 90°, and extends forward in the extending direction D2004 to the circuit terminal 2012. In each of the fusible bodies 2013, a part extending in the extending direction D2004 is formed to be shorter than a part extending in the intersecting direction D2005.

Also, as described above with reference to FIG. 9, in the present embodiment, the second opposed plate 2111 located on an upper side in FIG. 9 out of the opposed plates 2111 and 2112 as the pair is folded in the direction of the arrow D2001 to head for the first opposed plate 2112. The two fusible bodies 2013 are provided to be continuous with the first opposed plate 2112.

In the fuse unit 2001 according to the present embodiment, the battery terminal 2011, the two circuit terminals 2012, and the fusible bodies 2013 are integrally cut out from a single conductive metal plate and formed.

Also, the fuse unit 2001 is formed with the end portion of the battery terminal 2011 on the side of the fusible bodies 2013, the two circuit terminals 2012, and the fusible bodies 2013 covered with and fixed by (molded with) an insulating resin material. A resin housing 2018 made of the insulating resin material covers and fixes respective parts of the end portion of the battery terminal 2011 on the side of the fusible bodies 2013, the two circuit terminals 2012, and the fusible bodies 2013 in a state in which respective connecting surfaces of the circuit terminals 2012 are exposed, and in which windows 2181 are provided to enable fusing of the fusible bodies 2013 to be visually recognized. This resin housing 2018 is formed integrally with the battery terminal 2011, the two circuit terminals 2012, and the fusible bodies 2013 by means of insert molding. Also, this insert molding is performed in a state in which the connection screws 2017 are inserted in the insertion holes 2121 of the circuit terminals 2012. Each window 2181 of the resin housing 2018 for visually recognizing fusing is covered with a transparent cover 2019, and fusing of the fusible body 2013 is visually recognized through this transparent cover 2019.

Figure 14:
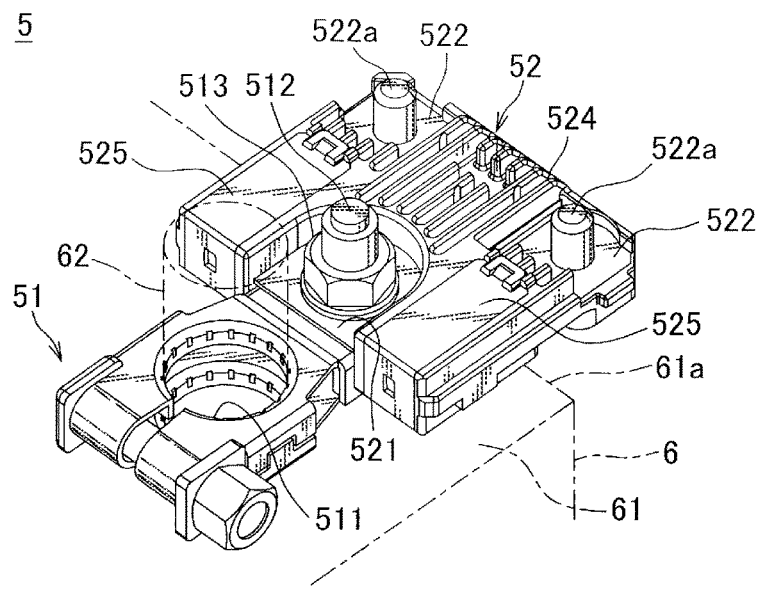
FIG. 14 illustrates an example of a conventional fuse unit.
Figure 15:
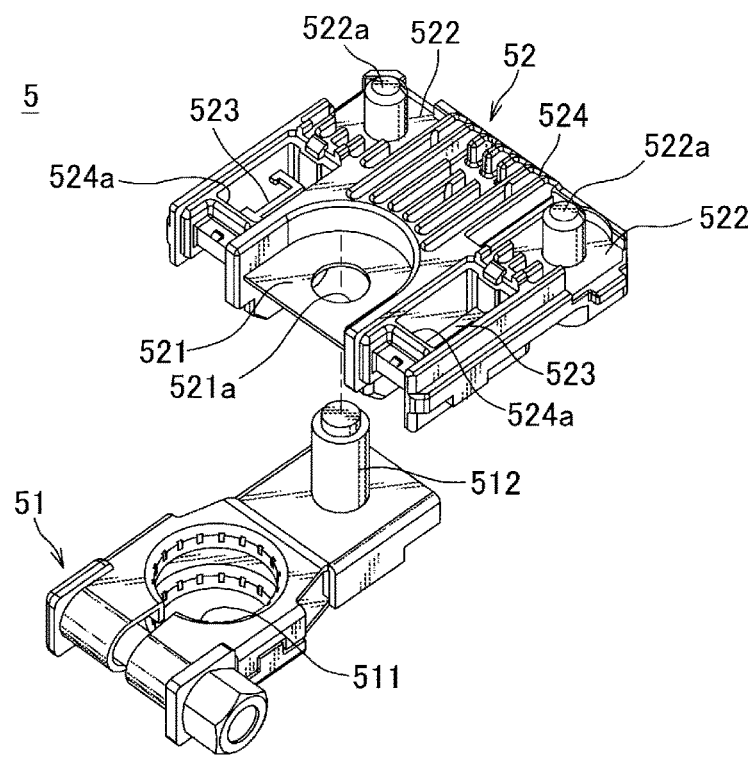
FIG. 15 is an exploded view of the fuse unit illustrated in FIG. 14.

With the aforementioned fuse unit 2001 according to the third embodiment, each fusible body 2013 extends both in the extending direction D2004 of the battery terminal 2011 and in the intersecting direction D2005 intersecting with the extending direction D2004 so that the part extending in the extending direction D2004 may be shorter than the part extending in the intersecting direction D2005. This restricts a dimension of the fusible body 2013 in the extending direction D2004 heading for the outer edge 2021*a* of the terminal attaching surface 2021 of the battery 2002. Also, since the battery terminal 2011, the circuit terminals 2012, and the fusible bodies 2013 are integrally cut out from the single conductive metal plate and formed, a part adapted to couple the battery terminal, such as the power feeding terminal 521 illustrated in FIGS. 14 and 15, is dispensed with. Accordingly, a dimension of the fuse unit 2001 in the extending direction D2004 heading for the outer edge 2021*a* of the terminal attaching surface 2021 is reduced, and as a result, protrusion when the fuse unit 2001 is attached to the battery 2002 can be restricted.

Also, with this fuse unit 2001, since the battery terminal 2011 is formed so that the opposed plates 2111 and 2112 as the pair formed by folding approximately in the U shape the strip plate 2011' may be respectively provided with the electrode insertion holes 2113 and 2114 in which the rod-like electrode 2022 is to be inserted, stability of attachment of the battery terminal 2011 (that is, the fuse unit 2001) to the rod-like electrode 2022 is improved. Further, since the fusible bodies 2013 are cut out integrally with the first opposed plate 2112 and formed continuously with the first opposed plate 2112, when this battery terminal 2011 is formed to be folded by means of a process such as pressing so that the second opposed plate 2111 out of the opposed plates 2111 and 2112 as the pair may head for the first opposed plate 2112, load to be applied to the fusible bodies 2013 at the time of the folding process such as vibration can be restricted.

Figure 11:
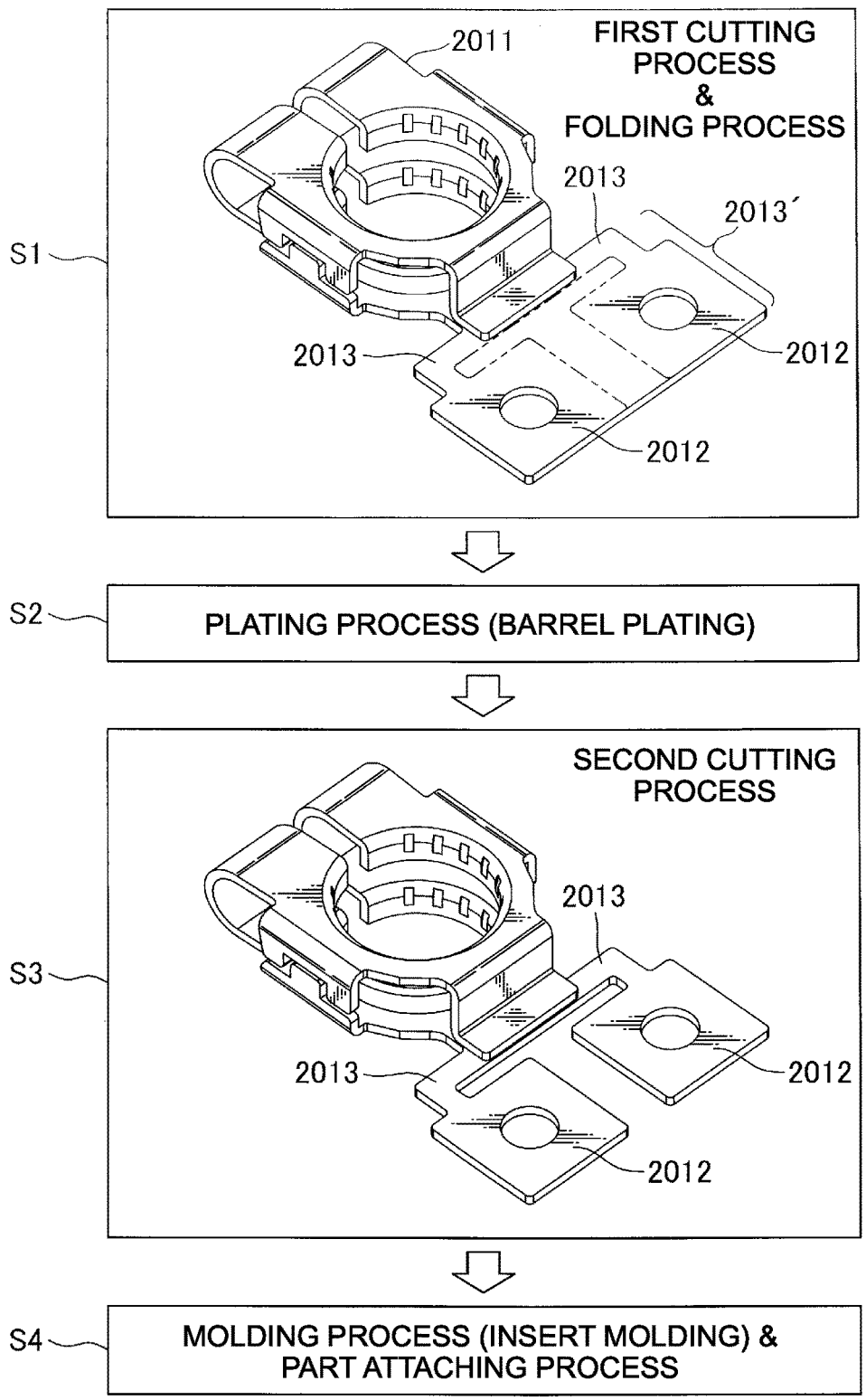
FIG. 11 is a flowchart schematically illustrating a method for manufacturing a fuse unit, in which the fuse unit illustrated in FIGS. 7 to 10B is manufactured.

Next, a method for manufacturing a fuse unit, in which the fuse unit 2001 illustrated in FIGS. 7 to 10B is manufactured, will be described with reference to FIG. 11. FIG. 11 is a flowchart schematically illustrating a method for manufacturing a fuse unit, in which the fuse unit 2001 illustrated in FIGS. 7 to 10B is manufactured.

In this method for manufacturing a fuse unit, in step S1, a first cutting process for cutting a single conductive metal plate in the following manner is first executed. In the first cutting process, a wide plate portion 2013' in a state in which a gap between the two circuit terminals 2012 and between the fusible bodies 2013 is filled and the battery terminal 2011 are cut out from a single conductive metal plate. The wide plate portion 2013' corresponds to an example of "a wide plate portion including the fusible body and wider than the fusible body" according to the present invention. The battery terminal 2011 is cut out in a not-illustrated developed shape. Also, in step S1, a folding process for folding and processing the metal plate from the developed shape into a desired shape by means of a process such as pressing is executed for the battery terminal 2011.

Subsequently, in step S2, a plating process for plating the wide plate portion 2013' including the two circuit terminals 2012 and the fusible bodies 2013 and the battery terminal 2011 is executed. In the present embodiment, as the plating process, barrel plating (also referred to as rotation plating) for rotating a plating bath containing a plurality of target parts to perform plating inexpensively is employed.

In step S3, subsequent to the plating process in step S2, a second cutting process for removing a part corresponding to the gap between the two circuit terminals 2012 and between the fusible bodies 2013 from the wide plate portion 2013' to cut out the two circuit terminals 2012 and the fusible bodies 2013 is executed.

Finally, in step S4, a molding process by means of insert molding is executed to form the resin housing 2018. This insert molding is performed in a state in which the connection screws 2017 are inserted in the insertion holes 2121 of the circuit terminals 2012. After the molding process, a part attaching process for covering the windows 2181 for visually recognizing fusing of the fusible bodies 2013 with the transparent covers 2019 and attaching the tightening screw 2014, the square washer 2015, and the nut 2016 to the battery terminal 2011 is performed, to complete the fuse unit 2001.

Meanwhile, the insertion holes 2121 of the circuit terminals 2012 may be opened in the first cutting process (step S1) or in the second cutting process (step S3). When to open the insertion holes 2121 is not specified. In a case in which the insertion holes 2121 are opened in the first cutting process (step S1), the insertion holes 2121 can be used as reference holes for positioning when the two circuit terminals 2012 and the fusible bodies 2013 are cut out in the second cutting process (step S3).

According to the aforementioned method for manufacturing a fuse unit, the second cutting process (step S3) for cutting the fusible bodies 2013 from the wide plate portion 2013' is executed after the plating process (step S2). Accordingly, an event such as deformation of the fusible bodies 2013 during plating can be prevented even without care of treating the fusible bodies 2013 at the time of the plating process, and the barrel plating can thus be employed as the plating process in the present embodiment.

Figure 12:
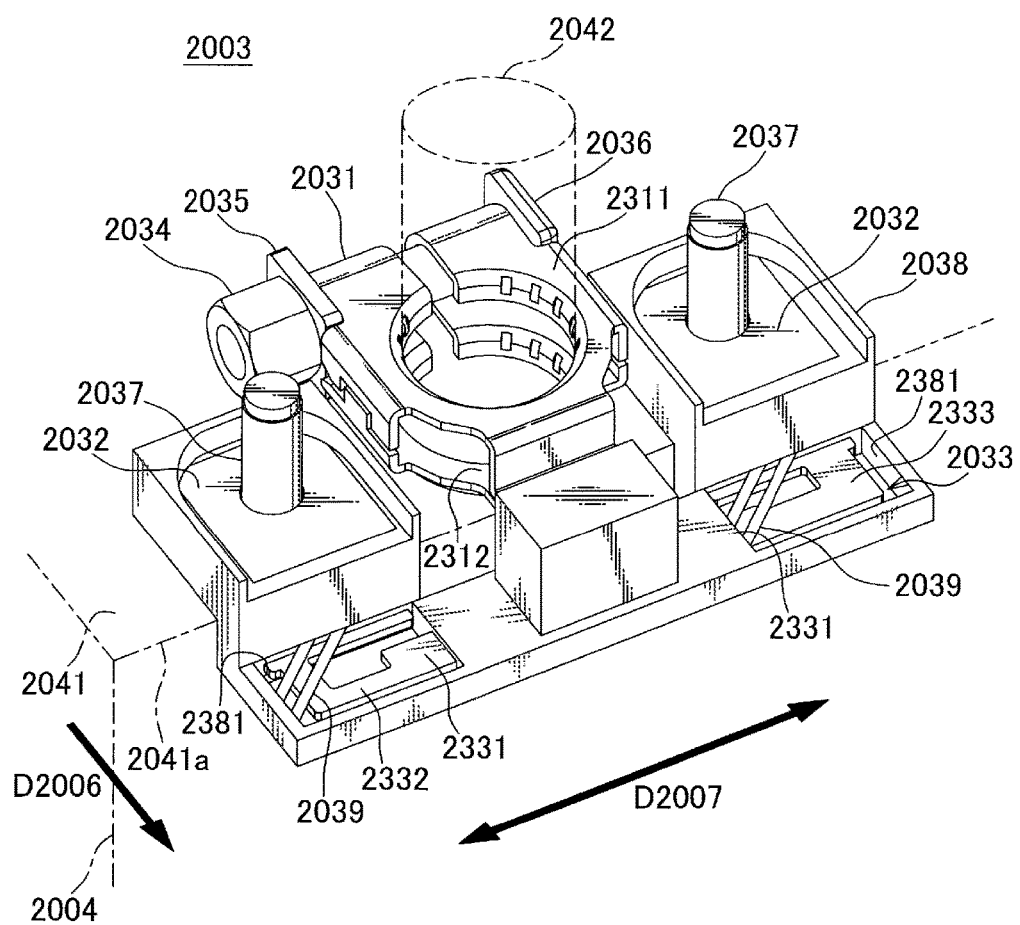
FIG. 12 is a perspective view of a fuse unit according to a fourth embodiment.
Figure 13:
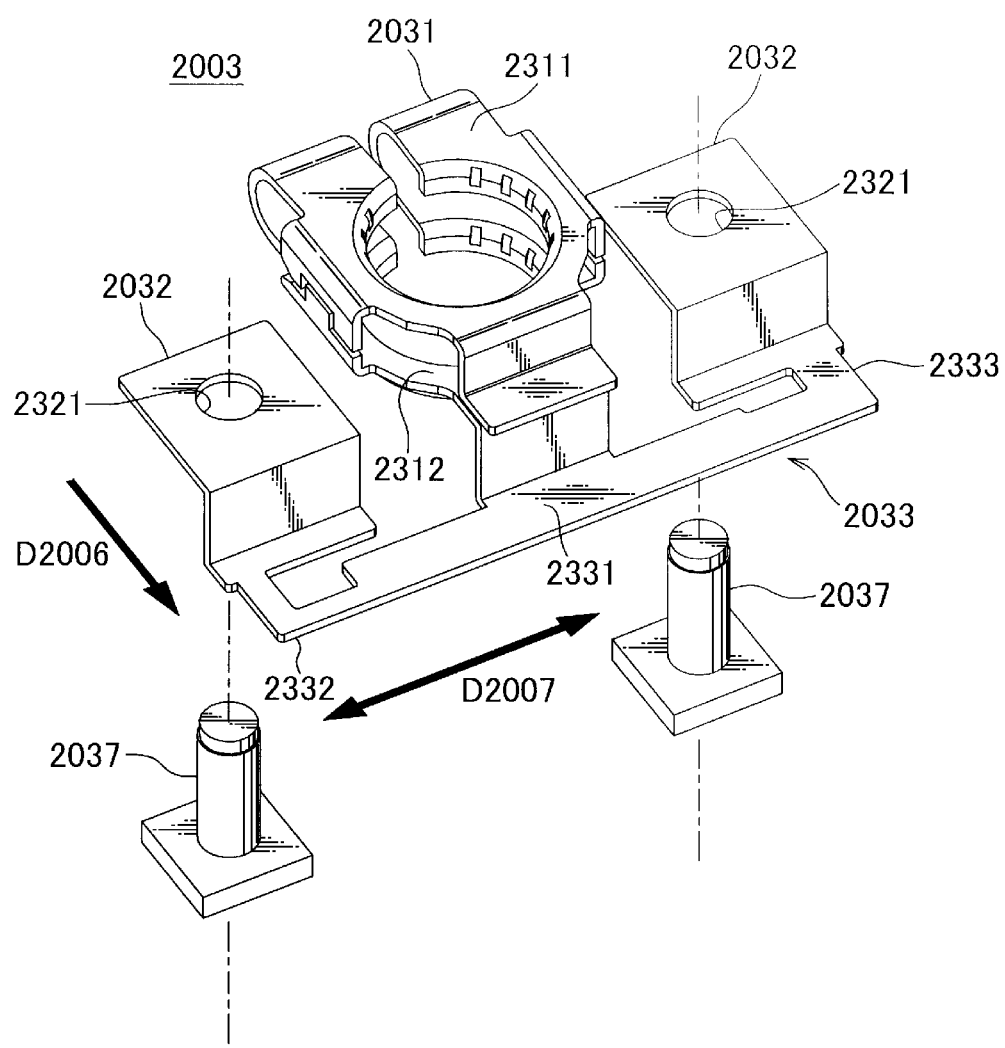
FIG. 13 is a perspective view illustrating a state in which a resin housing and a tightening screw are removed from the fuse unit illustrated in FIG. 12.

Next, a fuse unit according to a fourth embodiment of the present invention will be described with reference to FIGS. 12 and 13. FIG. 12 is a perspective view of a fuse unit according to the fourth embodiment, and FIG. 13 is a perspective view illustrating a state in which a resin housing and a tightening screw are removed from the fuse unit illustrated in FIG. 12.

In a fuse unit 2003 according to the present embodiment, circuit terminals 2032 are arranged adjacent to a battery terminal 2031 configured similarly to the battery terminal 2011 according to the third embodiment in the following manner. That is, the circuit terminals 2032 are arranged adjacent to the battery terminal 2031 in an intersecting direction D2007, which intersects with an extending direction D2006 in which the battery terminal 2031 connected to a rod-like electrode 2042 of a battery 2004 extends toward an outer edge 2041a of a terminal attaching surface 2041, and which is approximately parallel to the terminal attaching surface 2041.

A fusible body 2033 extends in the intersecting direction D2007 from the battery terminal 2031 at a forward position in the extending direction D2006 away from the circuit terminal 2032, is then bent backward in the extending direction D2006, and extends to the circuit terminal 2032. Here, in the present embodiment, the fusible body 2033 is arranged at a position one level below the circuit terminal 2032 to prevent interference with an electric wire or the like of a not-illustrated circuit connected to the circuit terminal 2032. Thus, an end portion of the circuit terminal 2032 on a side of the fusible body 2033 is bent 90° downward and is connected to the fusible body 2033. Similarly, an end portion, on the side of the fusible body 2033, of a lower opposed plate 2312 in FIG. 12 out of opposed plates 2311 and 2312 as a pair constituting the battery terminal 2031, is also bent 90° downward and is connected to the fusible body 2033. The fusible body 2033 is provided with a base part 2331 connected to the end portion of the lower opposed plate 2312 and is provided at both ends of the base part 2331 with fusible parts 2332 and 2333 formed to be narrower than the base part 2331 and fusing when current having a threshold value or higher flows. Also, out of the fusible parts 2332 and 2333 connected to the respective circuit terminals 2032, the left fusible part 2332 in FIG. 12 is formed to be narrower than the right fusible part 2333 in FIG. 12. Accordingly, the left fusible part 2332 in FIG. 12 functions as a small-capacity fuse which fuses due to lower current than current causing the right fusible part 2333 to fuse.

An attaching structure of the battery terminal 2031 to the rod-like electrode 2042 is similar to the attaching structure of the battery terminal 2011 to the rod-like electrode 2022 in the aforementioned third embodiment. To the battery terminal 2031, a tightening screw 2034, a square washer 2035, and a nut 2036 constituting this attaching structure are attached.

Also, the fuse unit 2003 according to the present embodiment is formed with the end portion of the battery terminal 2031 on the side of the fusible body 2033, the two circuit terminals 2032, and the fusible body 2033 molded with an insulating resin material. A resin housing 2038 made of the insulating resin material covers and fixes respective parts of the end portion of the battery terminal 2031 on the side of the fusible body 2033, the two circuit terminals 2032, and the fusible body 2033 in a state in which respective connecting surfaces of the circuit terminals 2032 are exposed, and in which windows 2381 are provided to enable fusing of the fusible body 2033 to be visually recognized. This resin housing 2038 is formed integrally with the battery terminal 2031, the two circuit terminals 2032, and the fusible body 2033 by means of insert molding. Also, this insert molding is performed in a state in which connection screws 2037 are inserted in insertion holes 2321 of the circuit terminals 2032. Each window 2381 of the resin housing 2038 for visually recognizing fusing is covered with a transparent cover 2039, and fusing of the fusible body 2033 is visually recognized through this transparent cover 2039.

With the aforementioned fuse unit 2003 according to the fourth embodiment, the circuit terminals 2032 are arranged adjacent to the battery terminal 2031 in the intersecting direction D2007. Accordingly, a dimension of the fuse unit 2003 can be reduced in the extending direction D2006 of the battery terminal 2031 further than in a case in which the circuit terminals 2032 are arranged forward in the extending direction D2006 of the battery terminal 2031, and as a result, protrusion when the fuse unit 2003 is attached to the battery 2004 can further be restricted.

Also, with this fuse unit 2003, the fusible body 2033 extends in the intersecting direction D2007 from the battery terminal 2031, is then bent backward in the extending direction D2006, and extends to the circuit terminal 2032 arranged adjacent to the battery terminal 2031 in the intersecting direction D2007. The fusible body 2033 needs to have certain length to obtain a resistance value required for fusing. By employing the aforementioned bent shape, the fusible body 2033 can be formed to have sufficient length without significantly separating the battery terminal 2031 from the circuit terminal 2032 in the intersecting direction D2007. Accordingly, a dimension of the fuse unit 2003 in the intersecting direction D2007 of the battery terminal 2031 can also be reduced.

It is to be noted that the above-described third and fourth embodiments merely show illustrative embodiments of the present invention, and that the present invention is not limited to these embodiments. That is, the present invention can be modified in various ways and carried out without departing from the spirit of the present invention. Such modification shall be included in the scope of the present invention as long as the modification includes a configuration of the fuse unit according to the present invention or a configuration of the method for manufacturing a fuse unit.

For example, in the above third embodiment, as an example of the fuse unit according to the present invention, the fuse units 2001 and 2003 in which the two circuit terminals are provided, and in which each of the circuit terminals is provided with one fusible body are raised. However, the fuse unit according to the present invention is not limited to this embodiment and may be an embodiment in which one or three or more circuit terminals is/are provided, for example. Also, in a case in which a plurality of circuit terminals are provided, each of the plurality of circuit terminals does not need to be provided with the fusible body, and an embodiment in which only circuit terminals connected to circuits required to be protected by fusing are provided with the fusible bodies is available.

Also, as examples of the fusible body "extending both in the extending direction and in the intersecting direction so that the part extending in the extending direction may be shorter" according to the present invention, the third embodiment illustrates the L-shaped fusible body 2013 bent 90° in the middle, and the fourth embodiment illustrates the fusible body 2033 including the L-shaped fusible parts 2332 and 2333 each bent 90° in the middle. However, the fusible body according to the present invention is not limited to these and may be one formed in a meandering shape, for example, as long as the part extending in the extending direction is shorter.

Also, in the aforementioned fourth embodiment, as an example of the fusible body connecting the battery terminal to the circuit terminal arranged adjacent to the battery terminal in the intersecting direction, the fusible body 2033 including the L-shaped fusible parts 2332 and 2333 each bent 90° in the middle is raised. However, the fusible body connecting the battery terminal to the circuit terminal arranged as above is not limited to this and may be one formed to straightly extend only in the intersecting direction from a side surface of the battery terminal to the circuit terminal.

Also, in the third and fourth embodiments, as examples of the circuit terminal according to the present invention, the square-plate-shaped circuit terminals 2012 and 2032 arranged approximately parallel to the terminal attaching surfaces 2021 and 2041 of the batteries 2002 and 2004 are raised. However, the circuit terminal according to the present invention may be one arranged approximately parallel to a side surface of the battery perpendicular to the terminal attaching surface, one bent in an L shape, or the like. That is, in the circuit terminal according to the present invention, no specific arrangement or shape thereof is questioned as long as the circuit terminal is a terminal to which a circuit operated by power from a battery is connected.

What is claimed is:

1. A battery terminal comprising:
a terminal main body provided in a pair of opposed plates formed by folding approximately in a U shape a strip plate made of a conductive metal respectively with electrode insertion holes in which a rod-like electrode projecting from a terminal attaching surface in a battery is sequentially inserted, and formed to extend toward an outer edge of the terminal attaching surface at time of being connected to the rod-like electrode; and
a joint joining the pair of the opposed plates in a state in which the opposed plates surface-contact and overlap each other on an opposite side of a folded part as seen from the electrode insertion hole.

2. The battery terminal according to claim 1, wherein the joint is formed by means of insert molding to cover and fix the pair of the opposed plates with an insulating resin material together on the opposite side.

3. The battery terminal according to claim 2, further comprising:
a circuit terminal connected to a circuit operated by power from the battery; and
a fusible body connecting the terminal main body to the circuit terminal in a strip shape which is narrower than the terminal main body and the circuit terminal and fusing when current over a threshold value flows,
wherein the terminal main body, the circuit terminal, and the fusible body are integrally cut out from a single conductive metal plate and formed, and
wherein the joint is formed by covering and fixing respective parts of the circuit terminal and the fusible body with the insulating resin material so that a connecting surface to the circuit in the circuit terminal is exposed, and so that fusing of the fusible body can be visually recognized.

4. The battery terminal according to claim 3, wherein the fusible body extends only in an intersecting direction, which intersects with an extending direction of the terminal main body, and which is approximately parallel to the terminal attaching surface, or extends both in the extending direction and in the intersecting direction so that a part extending in the extending direction is shorter.

5. The battery terminal according to claim 4, wherein a first opposed plate out of the pair of the opposed plates has the opposite side formed in a flat plate shape, and
wherein a second opposed plate out of the pair of the opposed plates has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

6. The battery terminal according to claim 3, wherein a first opposed plate out of the pair of the opposed plates has the opposite side formed in a flat plate shape, and
wherein a second opposed plate out of the pair of the opposed plates has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

7. The battery terminal according to claim 2, wherein a first opposed plate out of the pair of the opposed plates has the opposite side formed in a flat plate shape, and
wherein a second opposed plate out of the pair of the opposed plates has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

8. The battery terminal according to claim 1, wherein a first opposed plate out of the pair of the opposed plates has the opposite side formed in a flat plate shape, and
wherein a second opposed plate out of the pair of the opposed plates has the opposite side formed in a step-like bent shape in which the second opposed plate extends parallel to the first opposed plate, heads for the first opposed plate, extends parallel to the first opposed plate again, and surface-contacts and overlaps the first opposed plate as a parallel portion.

9. A fuse unit comprising:
a battery terminal connected at or around a first end thereof to a rod-like electrode projecting from a terminal attaching surface in a battery and extending toward a second end thereof to an outer edge of the terminal attaching surface;
a circuit terminal connected to a circuit operated by power from the battery; and
a fusible body connecting the battery terminal to the circuit terminal in a strip shape which is narrower than the battery terminal and the circuit terminal and fusing when current over a threshold value flows,
wherein the fusible body extends only in an intersecting direction, which intersects with an extending direction of the battery terminal, and which is approximately parallel to the terminal attaching surface, or extends both in the extending direction and in the intersecting direction so that a part extending in the extending direction is shorter, and
wherein the battery terminal, the circuit terminal, and the fusible body are integrally cut out from a single conductive metal plate and formed.

10. The fuse unit according to claim 9, wherein the battery terminal is provided in a pair of opposed plates formed by folding a strip plate approximately in a U shape respectively with electrode insertion holes in which the rod-like electrode is sequentially inserted, and is formed, after being cut out in a developed shape from the single plate, by folding a second opposed plate out of the pair of the opposed plates to head for a first opposed plate out of the pair of the opposed plates, while keeping the first opposed plate out of the pair of the opposed plates still, and
wherein the fusible body is cut out integrally with the first opposed plate and formed continuously with the first opposed plate.

11. The fuse unit according to claim 10, wherein the circuit terminal is arranged adjacent to the battery terminal in the intersecting direction.

12. The fuse unit according to claim 11, wherein the fusible body extends in the intersecting direction from the battery terminal at a forward position in the extending direction away from the circuit terminal, is then bent backward in the extending direction, and extends to the circuit terminal.

13. The fuse unit according to claim 9, wherein the circuit terminal is arranged adjacent to the battery terminal in the intersecting direction.

14. The fuse unit according to claim 13, wherein the fusible body extends in the intersecting direction from the battery terminal at a forward position in the extending direction away from the circuit terminal, is then bent backward in the extending direction, and extends to the circuit terminal.

15. A method for manufacturing a fuse unit including:
a battery terminal connected at or around a first end thereof to a rod-like electrode projecting from a terminal attaching surface in a battery and extending toward a second end thereof to an outer edge of the terminal attaching surface;
a circuit terminal connected to a circuit operated by power from the battery; and
a fusible body connecting the battery terminal to the circuit terminal in a strip shape which is narrower than the battery terminal and the circuit terminal and fusing when current over a threshold value flows,
wherein, in the fuse unit, the fusible body extends only in an intersecting direction, which intersects with an extending direction of the battery terminal, and which is approximately parallel to the terminal attaching surface, or extends both in the extending direction and in the intersecting direction so that a part extending in the extending direction may be shorter,
the method comprising:
a cutting process for integrally cutting out the battery terminal, the circuit terminal, and the fusible body from a single conductive metal plate.

16. The method for manufacturing a fuse unit according to claim 15, wherein the cutting process includes a first cutting process for integrally cutting out a wide plate portion including the fusible body and wider than the fusible body, the battery terminal, and the circuit terminal from the single plate and a second cutting process for cutting the fusible body from the wide plate portion, and further comprising:

a plating process for plating the battery terminal, the circuit terminal, and the wide plate portion after the first cutting process and before the second cutting process.

17. The method for manufacturing a fuse unit according to claim 15, wherein the battery terminal is provided in a pair of opposed plates formed by folding a strip plate approximately in a U shape respectively with electrode insertion holes in which the rod-like electrode is sequentially inserted, and is formed, after being cut out in a developed shape from the single plate, by folding a second opposed plate out of the opposed plates as the pair to head for a first opposed plate out of the opposed plates as the pair, while keeping the first opposed plate still out of the opposed plates as the pair, and wherein the fusible body is cut out integrally with the first opposed plate and formed continuously with the first opposed plate.

18. The method for manufacturing a fuse unit according to claim 15, wherein the circuit terminal is arranged adjacent to the battery terminal in the intersecting direction.

19. The method for manufacturing a fuse unit according to claim 18, wherein the fusible body extends in the intersecting direction from the battery terminal at a forward position in the extending direction away from the circuit terminal, is then bent backward in the extending direction, and extends to the circuit terminal.

* * * * *